(12) United States Patent
Zhao et al.

(10) Patent No.: US 10,880,564 B2
(45) Date of Patent: Dec. 29, 2020

(54) TRANSFORM SELECTION FOR VIDEO CODING

(71) Applicant: QUALCOMM Incorporated, San Diego, CA (US)

(72) Inventors: Xin Zhao, San Diego, CA (US); Li Zhang, San Diego, CA (US); Jianle Chen, San Diego, CA (US); Vadim Seregin, San Diego, CA (US); Xiang Li, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 12 days.

(21) Appl. No.: 15/719,202

(22) Filed: Sep. 28, 2017

(65) Prior Publication Data

US 2018/0098081 A1   Apr. 5, 2018

Related U.S. Application Data

(60) Provisional application No. 62/403,112, filed on Oct. 1, 2016.

(51) Int. Cl.
| | |
|---|---|
| *H04N 19/14* | (2014.01) |
| *H04N 19/44* | (2014.01) |
| *H04N 19/157* | (2014.01) |
| *H04N 19/12* | (2014.01) |
| *H04N 19/46* | (2014.01) |
| *H04N 19/136* | (2014.01) |

(Continued)

(52) U.S. Cl.
CPC ............ *H04N 19/45* (2014.11); *H04N 19/12* (2014.11); *H04N 19/136* (2014.11); *H04N 19/137* (2014.11); *H04N 19/14* (2014.11); *H04N 19/157* (2014.11); *H04N 19/176* (2014.11); *H04N 19/46* (2014.11); *H04N 19/61* (2014.11); *H04N 19/82* (2014.11); *H04N 19/96* (2014.11)

(58) Field of Classification Search
CPC .... H04N 19/136; H04N 19/14; H04N 19/157; H04N 19/137; H04N 19/12; H04N 19/45; H04N 19/61; H04N 19/46; H04N 19/176
See application file for complete search history.

(56) References Cited

U.S. PATENT DOCUMENTS

| | | | |
|---|---|---|---|
| 6,278,737 B1 * | 8/2001 | Oami | H04N 19/105 |
| | | | 375/240.2 |
| 2003/0053711 A1 * | 3/2003 | Kim | H04N 19/593 |
| | | | 382/268 |

(Continued)

OTHER PUBLICATIONS

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.

(Continued)

*Primary Examiner* — Neil R Mikeska
(74) *Attorney, Agent, or Firm* — Shumaker & Sieffert, P.A.

(57) ABSTRACT

A device for video coding is configured to determine a characteristic of a predictive block of a current block of a current picture; identify a transform for decoding the current block based on the characteristic; inverse transform coefficients to determine a residual block for the current block; and add the residual block to a predictive block of the current block to decode the current block.

28 Claims, 10 Drawing Sheets

(51) Int. Cl.
H04N 19/137 (2014.01)
H04N 19/176 (2014.01)
H04N 19/61 (2014.01)
H04N 19/96 (2014.01)
H04N 19/82 (2014.01)

(56) References Cited

U.S. PATENT DOCUMENTS

| | | | |
|---|---|---|---|
| 2008/0049854 A1 | 2/2008 | Kim et al. | |
| 2010/0040141 A1* | 2/2010 | Lei | H04N 19/147 375/240.03 |
| 2011/0002385 A1* | 1/2011 | Kobayashi | H04N 19/176 375/240.13 |
| 2012/0008675 A1 | 1/2012 | Karczewicz et al. | |
| 2012/0307906 A1* | 12/2012 | Kim | H04N 19/176 375/240.16 |
| 2013/0272422 A1* | 10/2013 | Lee | H04N 19/176 375/240.18 |
| 2014/0328387 A1* | 11/2014 | Puri | H04N 19/176 375/240.02 |
| 2015/0229948 A1* | 8/2015 | Puri | H04N 19/615 375/240.03 |
| 2016/0219290 A1 | 7/2016 | Zhao et al. | |
| 2017/0041602 A1* | 2/2017 | Oh | H04N 19/159 |
| 2017/0094313 A1 | 3/2017 | Zhao et al. | |
| 2017/0094314 A1 | 3/2017 | Zhao et al. | |
| 2017/0142444 A1* | 5/2017 | Henry | H04N 19/50 |
| 2017/0155905 A1* | 6/2017 | Puri | H04N 19/119 |
| 2017/0180731 A1* | 6/2017 | Oh | H04N 19/11 |
| 2018/0014026 A1* | 1/2018 | Lim | H04N 19/11 |
| 2018/0249179 A1* | 8/2018 | Han | H04N 19/60 |
| 2019/0028738 A1* | 1/2019 | Philippe | H04N 19/61 |

OTHER PUBLICATIONS

Chen J., et al., "Algorithm Description of Joint Exploration Test Model 2," Joint Video Exploration Team (JVET) of ITU-T SG 16 WP 3 and ISO/IEC JTC 1/SC 29/WG 11, 2nd Meeting, Document No. JVET-B1001_v1, Feb. 20-26, 2016, 31 pp.

Chen J., et al., "Algorithm Description of Joint Exploration Test Model 3," Document: JVET-C1001_v3, Joint Video Exploration Team (JVET) of ITU-T SG 16 WP 3 and ISO/IEC JTC 1/SC 29/WG 11, 3rd Meeting: Geneva, CH, May 26-Jun. 1, 2016, 37 Pages.

Martucci S.A., et al., "Symmetric convolution and the discrete sine and cosine transforms," IEEE Transactions on Signal Processing, vol. 42, No. 5, May 1, 1994, pp. 1038-1051, IEEE Signal Processing Society, XP000863873.

An, et al., "Non-CE7: Boundary-Dependent Transform for Inter-Predicted Residue," JCTVCG281, JCT-VC Meeting; Joint Collaborative Team on Video Coding (JCT-VC), of ITU-T SG16 WP3 and ISO/IEC JTC1/SC29/WG11; Nov. 21-30, 2011; document No. JCTVC-G281_r1, Nov. 22, 2011, 11 pp.

Wang Y-K. et al., "High Efficiency Video Coding (HEVC) Defect Report," Joint Collaborative Team on Video Coding (JCT-VC) of ITU-T SG 16 WP 3 and ISO/IEC JTC 1/SC 29/WG 11, Doc. JCTVC-N1003_v1, 14th Meeting, Vienna, AT, Jul. 25-Aug. 2, 2013, 311 pages.

Han et al., "Towards jointly optimal spatial prediction and adaptive transform in video/image coding," IEEE International Conference on Acoustics, Speech and Signal Processing (ICASSP), Mar. 2010, 4 pp.

Lim et al., "Rate distortion optimized adaptive transform coding," Optical Engineering, vol. 48, No. 8, pp. 087004-1-087004-14, Aug. 2009, 14 pp.

Ye et al., "Improved H.264 intra coding based on bidirectional intra prediction, directional transform, and adaptive coefficient scanning," in Proc. 15th IEEE Int. Conf. Image Process., Oct. 2008, 4 pp.

Zhao et al., "Video coding with rate distortion optimized transform," IEEE Transactions on Circuits and Systems for Video Technology, vol. 22, No. 1, Jan. 2012, 14 pp.

Saxena et al., "DCT/DST-Based Transform Coding for Intra Prediction in Image/Video Coding," IEEE Transactions on Image Processing, vol. 22, No. 10, Oct. 2013, 8 pp.

Yeo et al., "Mode-Dependent Transforms for Coding Directional Intra Prediction Residuals," IEEE Transactions on Circuits and Systems for Video Technology, vol. 22, No. 4, Apr. 2012, 10 pp.

Zou et al., "Rate-Distortion Optimized Transforms Based on the Lloyd-Type Algorithm for Intra Block Coding ," IEEE Journal of Selected Topics in Signal Processing, vol. 7, Issue: 6, Dec. 2013, 12 pp.

Jain, "A sinusoidal family of unitary transforms," IEEE Transactions on Pattern Analysis and Machine Intelligence, Oct. 1, 1979, IEEE Service Center, 10 pp.

Biatek, et al., "Adaptive Transform Sets for Inter Coding," Joint Collaborative Team on Video Coding (JCT-VC) of ITU-T SG 16 WP 3 and ISO/IEC JTC 1/SC 29/WG 11, Oct. 15-21, 2016, Doc. JVET-D0070, Oct. 17, 2016, 7 pp.

Girod, Bernd, "Transform Coding," accessed from web.stanford. edu/class/ee398a/handouts/lectures/07-TransformCoding.pdf, last modified Feb. 8, 2012, 32 slides.

Lan, et al., "Exploiting non-local correlation via signal-dependent transform (SDT)," IEEE Journal of Selected Topics in Signal Processings 5.7; Nov. 2011; pp. 1298-1308.

Cao X., et al., "Singular Vector Decomposition Based Adaptive Transform for Motion Compensation Residuals," 2014 IEEE International Conference on Image Processing (ICIP 2014): Paris, France, Oct. 1, 2014, pp. 4127-4131, XP055238396, Piscataway, NJ, DOI: 10.1109/ICIP.2014/025838, ISBN: 978-1-4799-5751-4.

International Search Report and Written Opinion—PCT/US2017/054379—ISA/EPO—dated Jan. 16, 2018 19 pages.

International Preliminary Report on Patentability—PCT/US2017/054379—ISA/EPO—dated Apr. 11, 2019 12 pages.

* cited by examiner

4x4 DST-VII:

{29, 55, 74, 84}
{74, 74,  0,-74}
{84,-29,-74, 55}
{55,-84, 74,-29}     FIG. 2A

4-point DCT-II:

{64, 64, 64, 64}
{83, 36,-36,-83}
{64,-64,-64, 64}
{36,-83, 83,-36}     FIG. 2B

8-point DCT-II:

{64, 64, 64, 64, 64, 64, 64, 64}
{89, 75, 50, 18,-18,-50,-75,-89}
{83, 36,-36,-83,-83,-36, 36, 83}
{75,-18,-89,-50, 50, 89, 18,-75}
{64,-64,-64, 64, 64,-64,-64, 64}
{50,-89, 18, 75,-75,-18, 89,-50}
{36,-83, 83,-36,-36, 83,-83, 36}
{18,-50, 75,-89, 89,-75, 50,-18}     FIG. 2C

16-point DCT-II:

{64, 64, 64, 64, 64, 64, 64, 64, 64, 64, 64, 64, 64, 64, 64, 64}
{90, 87, 80, 70, 57, 43, 25,  9, -9,-25,-43,-57,-70,-80,-87,-90}
{89, 75, 50, 18,-18,-50,-75,-89,-89,-75,-50,-18, 18, 50, 75, 89}
{87, 57,  9,-43,-80,-90,-70,-25, 25, 70, 90, 80, 43, -9,-57,-87}
{83, 36,-36,-83,-83,-36, 36, 83, 83, 36,-36,-83,-83,-36, 36, 83}
{80,  9,-70,-87,-25, 57, 90, 43,-43,-90,-57, 25, 87, 70, -9,-80}
{75,-18,-89,-50, 50, 89, 18,-75,-75, 18, 89, 50,-50,-89,-18, 75}
{70,-43,-87,  9, 90, 25,-80,-57, 57, 80,-25,-90, -9, 87, 43,-70}
{64,-64,-64, 64, 64,-64,-64, 64, 64,-64,-64, 64, 64,-64,-64, 64}
{57,-80,-25, 90, -9,-87, 43, 70,-70,-43, 87,  9,-90, 25, 80,-57}
{50,-89, 18, 75,-75,-18, 89,-50,-50, 89,-18,-75, 75, 18,-89, 50}
{43,-90, 57, 25,-87, 70,  9,-80, 80, -9,-70, 87,-25,-57, 90,-43}
{36,-83, 83,-36,-36, 83,-83, 36, 36,-83, 83,-36,-36, 83,-83, 36}
{25,-70, 90,-80, 43,  9,-57, 87,-87, 57, -9,-43, 80,-90, 70,-25}
{18,-50, 75,-89, 89,-75, 50,-18,-18, 50,-75, 89,-89, 75,-50, 18}
{9, -25, 43,-57, 70,-80, 87,-90, 90,-87, 80,-70, 57,-43, 25, -9}     FIG. 2D

32-point DCT-II:

TRANSFORM SELECTION FOR VIDEO CODING

This application claims the benefit of U.S. Provisional Patent Application No. 62/403,112 filed 1 Oct. 2016, the entire content of which is hereby incorporated by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the recently finalized High Efficiency Video Coding (HEVC) standard, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

This disclosure describes techniques related to determining a transform for the coding of residual data. More specifically, this disclosure describes techniques for deriving, at both a video encoder and a video decoder, certain transform information, such that the transform used to code a residual block can be signaled with little or, in some cases, no explicit signaling, thus saving bandwidth.

In one example, a method for decoding video data includes determining a characteristic of a predictive block of a current block of a current picture; identifying a transform for decoding the current block based on the characteristic; inverse transforming transform coefficients to determine a residual block for the current block; and adding the residual block to a predictive block of the current block to decode the current block.

In another example, a device for decoding video data includes a memory configured to store the video data and one or more processors configured to determine a characteristic of a predictive block of a current block of a current picture of the video data; identify a transform for decoding the current block based on the characteristic; inverse transform a set of transform coefficients to determine a residual block for the current block; and add the residual block to a predictive block of the current block to decode the current block.

In another example, an apparatus for decoding video data includes means for determining a characteristic of a predictive block of a current block of a current picture; means for identifying a transform for decoding the current block based on the characteristic; means for inverse transforming transform coefficients to determine a residual block for the current block; and means for adding the residual block to a predictive block of the current block to decode the current block.

In another example, a computer-readable medium for storing instructions that when executed by one or more processors cause the one or more processors to determine a characteristic of a predictive block of a current block of a current picture; identify a transform for decoding the current block based on the characteristic; inverse transform a set of transform coefficients to determine a residual block for the current block; and add the residual block to a predictive block of the current block to decode the current block.

The details of one or more aspects of the disclosure are set forth in the accompanying drawings and the description below. Other features, objects, and advantages of the techniques described in this disclosure will be apparent from the description and drawings, and from the claims.

BRIEF DESCRIPTION OF DRAWINGS

FIGS. 2A-2E are tables illustrating examples of transform types.

DETAILED DESCRIPTION

This disclosure describes techniques related to determining the one or more transforms use for the coding of residual data. More specifically, this disclosure describes techniques for deriving, at both a video encoder and a video decoder, certain transform information, such that the transform used to code a residual block can be signaled with little or, in some cases, no explicit signaling, thus potentially reducing the signaling overhead associated with signaling transforms. The techniques of this disclosure may be used in conjunction with any of the existing video codecs, such as HEVC (High Efficiency Video Coding), or may be an efficient coding tool for use in a future video coding standards, such as the H.266 standard and extensions thereof Various techniques in this disclosure may be described with reference to a video coder, which is intended to be a generic term that can refer to either a video encoder or a video decoder. Unless explicitly stated otherwise, it should not be assumed that techniques described with respect to a video encoder or a video decoder cannot be performed by the other of a video encoder or a video decoder. For example, in many instances, a video decoder performs the same, or sometimes a reciprocal, coding technique as a video encoder in order to decode encoded video data. In many instances, a video encoder also includes a video decoding loop, and thus the video encoder performs video decoding as part of encoding video data. Thus, unless stated otherwise, the techniques described in this disclosure with respect to a video decoder may also be performed by a video encoder, and vice versa.

This disclosure may also use terms such as current block, current picture, etc. In the context of this disclosure, the term current is intended to identify a block or picture that is currently being coded, as opposed to, for example, previously or already coded block or picture, or a yet to be coded block or picture.

Figure 1:
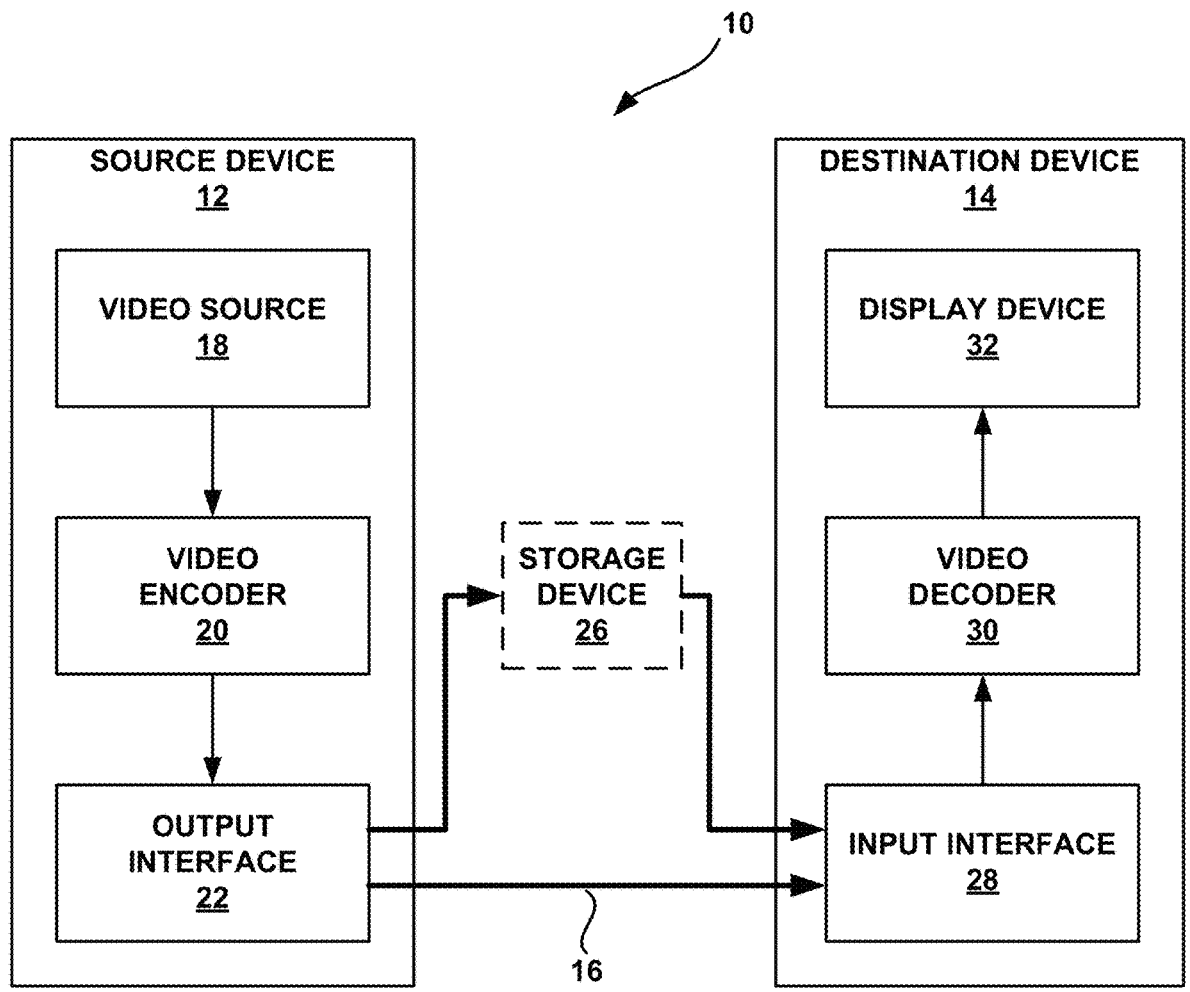
FIG. 1 is a block diagram illustrating an example video encoding and decoding system that may utilize the techniques described in this disclosure.

FIG. 1 is a block diagram illustrating an example video encoding and decoding system 10 that may utilize the techniques described in this disclosure. As shown in FIG. 1, system 10 includes a source device 12 that generates encoded video data to be decoded at a later time by a destination device 14. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via a link 16. Link 16 may comprise any type of medium or device capable of moving the encoded video data from source device 12 to destination device 14. In one example, link 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In another example, encoded data may be output from output interface 22 to a storage device 26. Similarly, encoded data may be accessed from storage device 26 by input interface. Storage device 26 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 26 may correspond to a file server or another intermediate storage device that may hold the encoded video generated by source device 12. Destination device 14 may access stored video data from storage device 26 via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 26 may be a streaming transmission, a download transmission, or a combination of both.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes a video source 18, video encoder 20 and an output interface 22. In some cases, output interface 22 may include a modulator/demodulator (modem) and/or a transmitter. In source device 12, video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones. However, the techniques described in this disclosure may be applicable to video coding in general, and may be applied to wireless and/or wired applications.

The captured, pre-captured, or computer-generated video may be encoded by video encoder 20. The encoded video data may be transmitted directly to destination device 14 via output interface 22 of source device 12. The encoded video data may also (or alternatively) be stored onto storage device 26 for later access by destination device 14 or other devices, for decoding and/or playback.

Destination device 14 includes an input interface 28, a video decoder 30, and a display device 32. In some cases, input interface 28 may include a receiver and/or a modem. Input interface 28 of destination device 14 receives the encoded video data over link 16. The encoded video data communicated over link 16, or provided on storage device 26, may include a variety of syntax elements generated by video encoder 20 for use by a video decoder, such as video decoder 30, in decoding the video data. Such syntax elements may be included with the encoded video data transmitted on a communication medium, stored on a storage medium, or stored a file server.

Display device 32 may be integrated with, or external to, destination device 14. In some examples, destination device 14 may include an integrated display device and also be configured to interface with an external display device. In other examples, destination device 14 may be a display device. In general, display device 32 displays the decoded video data to a user, and may comprise any of a variety of display devices such as a liquid crystal display (LCD), a plasma display, an organic light emitting diode (OLED) display, or another type of display device.

Video encoder 20 and video decoder 30 may operate according to a video compression standard, such as the recently finalized High Efficiency Video Coding (HEVC) standard. Video encoder 20 and video decoder 30 may additionally operate according to an HEVC extension, such as the range extension, the multiview extension (MV-HEVC), or the scalable extension (SHVC) which have been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG).

Video encoder 20 and video decoder 30 may also operate according to other proprietary or industry standards, such as the ITU-T H.264 standard, alternatively referred to as ISO/IEC MPEG-4, Part 10, Advanced Video Coding (AVC), or extensions of such standards, such as the Scalable Video Coding (SVC) and Multi-view Video Coding (MVC) extensions. The techniques of this disclosure, however, are not limited to any particular coding standard. Other examples of video compression standards include ITU-T H.261, ISO/IEC MPEG-1 Visual, ITU-T H.262 or ISO/IEC MPEG-2 Visual, ITU-T H.263, and ISO/IEC MPEG-4 Visual ITU-T VCEG (Q6/16) and ISO/IEC MPEG (JTC 1/SC 29/WG 11) are now studying the potential need for standardization of future video coding technology with a compression capability that significantly exceeds that of the current HEVC standard (including its current extensions and near-term extensions for screen content coding and high-dynamic-range coding). The groups are working together on this exploration activity in a joint collaboration effort known as the Joint Video Exploration Team (JVET) to evaluate compression technology designs proposed by their experts in this area. The JVET first met during 19-21 Oct. 2015. One version of reference software, i.e., Joint Exploration Model 2 (JEM 2) can be downloaded from: https://jvet.hhi.fraunhofer.de/svn/svn_HMJEMSoftware/tags/HM-16.6-JEM-2.0/. An algorithm for JEM2 is described in J. Chen, E. Alshina, G. J. Sullivan, J.-R. Ohm, J. Boyce, "Algorithm description of Joint Exploration Test Model 2", JVET-B1001, San Diego, March 2016, which description is incorporated herein by reference. Another version of the reference software, i.e., Joint Exploration Model 3 (JEM 3) can be downloaded from: https://jvet.hhi.fraunhofer.de/svn/svn_HMJEMSoftware/tags/HM-16.6-JEM-3.0/. The Algorithm description for JEM3 may also be referred to as JVET-C1001 and is incorporated herein by reference.

Techniques of this disclosure may utilize HEVC terminology for ease of explanation. It should not be assumed, however, that the techniques of this disclosure are limited to HEVC, and in fact, it is explicitly contemplated that the techniques of this disclosure may be implemented in successor standards to HEVC, e.g., H.266, and its extensions.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

In HEVC and other video coding specifications, a video sequence typically includes a series of pictures. Pictures may also be referred to as "frames." In one example approach, a picture may include three sample arrays, denoted $S_L$, $S_{Cb}$, and $S_{Cr}$. In such an example approach, $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

To generate an encoded representation of a picture, video encoder 20 may generate a set of coding tree units (CTUs). Each of the CTUs may comprise a coding tree block of luma samples, two corresponding coding tree blocks of chroma samples, and syntax structures used to code the samples of the coding tree blocks. In monochrome pictures or pictures having three separate color planes, a CTU may comprise a single coding tree block and syntax structures used to code the samples of the coding tree block. A coding tree block may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more coding units (CUs). A slice may include an integer number of CTUs ordered consecutively in a raster scan order.

To generate a coded CTU, video encoder 20 may recursively perform quad-tree partitioning on the coding tree blocks of a CTU to divide the coding tree blocks into coding blocks, hence the name "coding tree units." A coding block may be an N×N block of samples. A CU may comprise a coding block of luma samples and two corresponding coding blocks of chroma samples of a picture that has a luma sample array, a Cb sample array, and a Cr sample array, and syntax structures used to code the samples of the coding blocks. In monochrome pictures or pictures having three separate color planes, a CU may comprise a single coding block and syntax structures used to code the samples of the coding block.

Video encoder 20 may partition a coding block of a CU into one or more prediction blocks. A prediction block is a rectangular (i.e., square or non-square) block of samples on which the same prediction is applied. A prediction unit (PU) of a CU may comprise a prediction block of luma samples, two corresponding prediction blocks of chroma samples, and syntax structures used to predict the prediction blocks. In monochrome pictures or pictures having three separate color planes, a PU may comprise a single prediction block and syntax structures used to predict the prediction block. Video encoder 20 may generate predictive luma, Cb, and Cr blocks for luma, Cb, and Cr prediction blocks of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the picture associated with the PU. If video encoder 20 uses inter prediction to generate the predictive blocks of a PU, video encoder 20 may generate the predictive blocks of the PU based on decoded samples of one or more pictures other than the picture associated with the PU.

After video encoder 20 generates predictive luma, Cb, and Cr blocks for one or more PUs of a CU, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quad-tree partitioning to decompose the luma, Cb, and Cr residual blocks of a CU into one or more luma, Cb, and Cr transform blocks. A transform block is a rectangular (e.g., square or non-square) block of samples on which the same transform is applied. A transform unit (TU) of a CU may comprise a transform block of luma samples, two corresponding transform blocks of chroma samples, and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients.

Video encoder 20 may output a bitstream that includes a sequence of bits that forms a representation of coded pictures and associated data. The bitstream may comprise a sequence of Network Abstraction Layer (NAL) units. A NAL unit is a syntax structure containing an indication of the type of data in the NAL unit and bytes containing that data in the form of a raw byte sequence payload (RBSP) interspersed as necessary with emulation prevention bits. Each of the NAL units includes a NAL unit header and encapsulates a RBSP. The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, a first type of NAL unit may encapsulate an RBSP for a PPS, a second type of NAL unit may encapsulate an RBSP for a coded slice, a third type of NAL unit may encapsulate an RBSP for SEI messages, and so on. NAL units that encapsulate RBSPs for video coding data (as opposed to RBSPs for parameter sets and SEI messages) may be referred to as VCL NAL units.

Video decoder 30 may receive a bitstream generated by video encoder 20. In addition, video decoder 30 may parse the bitstream to obtain syntax elements from the bitstream. Video decoder 30 may reconstruct the pictures of the video data based at least in part on the syntax elements obtained from the bitstream. The process to reconstruct the video data may be generally reciprocal to the process performed by video encoder 20. In addition, video decoder 30 may inverse quantize coefficient blocks associated with TUs of a current CU. Video decoder 30 may perform inverse transforms on the coefficient blocks to reconstruct transform blocks associated with the TUs of the current CU. Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture.

The following is a description of discrete sine and cosine transforms. Video encoder 20 and video decoder may use transforms and inverse transforms, respectively, to code residual video data. Transform indicates the process of deriving an alternative representation of the input signal. For example, the transform converts values from the pixel domain to the frequency domain (e.g., in video encoding) or from frequency domain to pixel domain (e.g., in video decoding). Given an N-point vector $x=[x_0, x_1, \ldots, x_{N-1}]^T$ and a set of given vectors $\{\phi_0, \phi_1, \ldots, \phi_{M-1}\}$, x can be approximated or exactly represented using a linear combination of $\phi_0, \phi_1, \ldots, \phi_{M-1}$, which can be formulated as follows, $$\hat{x} = \sum_{i=0}^{M-1} f_i \cdot \Phi_i$$

where $\hat{x}$ can be an approximation or equivalent of x, vector $f=[f_0, f_1, f_2, \ldots, f_{M-1}]$ is called the transform coefficient vector and $\{\phi_0, \phi_1, \ldots, \phi_{M-1}\}$ are the transform basis vectors.

In the scenario of video coding, transform coefficients are roughly non-correlated and sparse, i.e., the energy of the input vector x is compacted only on a few transform coefficients, and the remaining majority transform coefficients are typically close to 0. For instance, when a video encoder transforms a transform block to a coefficient block, the nonzero coefficient values in the coefficient block tend to be grouped together at a top-left corner of the coefficient block, and a majority of the other coefficient values are zero. The nonzero coefficients grouped near the top-left corner of the coefficient block reflect low frequency components, whereas coefficient values near the bottom-right corner of the coefficient block, which tend to be zero, reflect high frequency components.

Given the specific input data, the optimal transform in terms of energy compaction is the so-called Karhunen-Loeve transform (KLT), which uses the eigen vectors of the covariance matrix of the input data as the transform basis vectors. Therefore, a KLT is actually a data-dependent transform and does not have a general mathematical formulation. However, under certain assumptions, e.g., the input data forms a first-order stationary Markov process, it has been proven in the literature that the corresponding KLT is actually a member of the sinusoidal family of unitary transforms, which is described in Jain, A. K., A sinusoidal family of unitary transforms, IEEE Trans. on Pattern Analysis and Machine Intelligence, 1, 356, 1979. The sinusoidal family of unitary transforms indicates transforms using transform basis vectors formulated as follows:

$$\phi_m(k) = A \cdot e^{ik\theta} + B \cdot e^{-ik\theta}$$

where e is the base of the natural logarithm approximately equal to 2.71828, A, B, and θ are complex in general, and depend on the value of m.

Several well-known transforms including the discrete Fourier, cosine, sine, and the KLT (for first-order stationary Markov processes) are members of this sinusoidal family of unitary transforms. According to S. A. Martucci, "Symmetric convolution and the discrete sine and cosine transforms," IEEE Trans. Sig. Processing SP-42, 1038-1051 (1994), the complete discrete cosine transform (DCT) and discrete sine transform (DST) families include totally 16 transforms based on different types, i.e., different values of A, B, and θ, and a complete definition of the different types of DCT and DST are given below.

Assume the input N-point vector is denoted as $x=[x_0, x_1, \ldots, x_{N-1}]^T$, and it is transformed to another N-point transform coefficient vector denoted as $y=[y_0, y_1, \ldots, y_{N-1}]^T$ by multiplying a matrix, the process of which can be further illustrated according to one of the following transform formulation, wherein k ranges from 0 through N−1, inclusive:

DCT Type-I (DCT-1):

$$y_k = \sum_{n=0}^{N-1} \sqrt{\frac{2}{N-1}} \cos\left(\frac{\pi \cdot n \cdot k}{N-1}\right) \cdot w_0 \cdot w_1 \cdot x_n,$$

where $$w_0 = \begin{cases} \frac{1}{\sqrt{2}}, & \text{if } n = 0 \text{ or } n = N-1 \\ 1, & \text{otherwise} \end{cases}, w_1 = \begin{cases} \frac{1}{\sqrt{2}}, & \text{if } k = 0 \text{ or } k = N-1 \\ 1, & \text{otherwise} \end{cases}$$

DCT Type-II (DCT-2):

$$y_k = \sum_{n=0}^{N-1} \sqrt{\frac{2}{N}} \cos\left(\frac{\pi \cdot (n+0.5) \cdot k}{N-1}\right) \cdot w_0 \cdot x_n,$$

where $$w_0 = \begin{cases} \frac{1}{\sqrt{2}}, & \text{if } k = 0 \\ 1, & \text{otherwise} \end{cases}$$

DCT Type-III (DCT-3):

$$y_k = \sum_{n=0}^{N-1} \sqrt{\frac{2}{N}} \cos\left(\frac{\pi \cdot n \cdot (k+0.5)}{N}\right) \cdot w_0 \cdot x_n,$$

where $$w_0 = \begin{cases} \frac{1}{\sqrt{2}}, & \text{if } n = 0 \\ 1, & \text{otherwise} \end{cases}$$

DCT Type-IV (DCT-4):

$$y_k = \sum_{n=0}^{N-1} \sqrt{\frac{2}{N}} \cos\left(\frac{\pi \cdot (n+0.5) \cdot (k+0.5)}{N}\right) \cdot x_n,$$

DCT Type-V (DCT-5):

$$y_k = \sum_{n=0}^{N-1} \sqrt{\frac{2}{N-0.5}} \cos\left(\frac{\pi \cdot n \cdot k}{N-0.5}\right) \cdot w_0 \cdot w_1 \cdot x_n,$$

where $$w_0 = \begin{cases} \frac{1}{\sqrt{2}}, & \text{if } n = 0 \\ 1, & \text{otherwise} \end{cases}, \quad w_1 = \begin{cases} \frac{1}{\sqrt{2}}, & \text{if } k = 0 \\ 1, & \text{otherwise} \end{cases}$$

DCT Type-VI (DCT-6):

$$y_k = \sum_{n=0}^{N-1} \sqrt{\frac{2}{N-0.5}} \cos\left(\frac{\pi \cdot (n+0.5) \cdot k}{N-0.5}\right) \cdot w_0 \cdot w_1 \cdot x_n,$$

where $$w_0 = \begin{cases} \frac{1}{\sqrt{2}}, & \text{if } n = N-1 \\ 1, & \text{otherwise} \end{cases}, \quad w_1 = \begin{cases} \frac{1}{\sqrt{2}}, & \text{if } k = 0 \\ 1, & \text{otherwise} \end{cases}$$

DCT Type-VII (DCT-7):

$$y_k = \sum_{n=0}^{N-1} \sqrt{\frac{2}{N-0.5}} \cos\left(\frac{\pi \cdot n \cdot (k+0.5)}{N-0.5}\right) \cdot w_0 \cdot w_1 \cdot x_n,$$

where $$w_0 = \begin{cases} \frac{1}{\sqrt{2}}, & \text{if } n = 0 \\ 1, & \text{otherwise} \end{cases}, \quad w_1 = \begin{cases} \frac{1}{\sqrt{2}}, & \text{if } k = N-1 \\ 1, & \text{otherwise} \end{cases}$$

DCT Type-VIII (DCT-8):

$$y_k = \sum_{n=0}^{N-1} \sqrt{\frac{2}{N+0.5}} \cos\left(\frac{\pi \cdot (n+0.5) \cdot (k+0.5)}{N+0.5}\right) \cdot x_n,$$

DST Type-I (DST-1):

$$y_k = \sum_{n=0}^{N-1} \sqrt{\frac{2}{N+1}} \sin\left(\frac{\pi \cdot (n+1) \cdot (k+1)}{N+1}\right) \cdot x_n,$$

DST Type-II (DST-2):

$$y_k = \sum_{n=0}^{N-1} \sqrt{\frac{2}{N}} \sin\left(\frac{\pi \cdot (n+0.5) \cdot (k+1)}{N}\right) \cdot w_0 \cdot x_n,$$

where $$w_0 = \begin{cases} \frac{1}{\sqrt{2}}, & \text{if } k = N-1 \\ 1, & \text{otherwise} \end{cases}$$

DST Type-III (DST-3):

$$y_k = \sum_{n=0}^{N-1} \sqrt{\frac{2}{N}} \sin\left(\frac{\pi \cdot (n+1) \cdot (k+0.5)}{N}\right) \cdot w_0 \cdot x_n,$$

where $$w_0 = \begin{cases} \frac{1}{\sqrt{2}}, & \text{if } n = N-1 \\ 1, & \text{otherwise} \end{cases}$$

DST Type-IV (DST-4):

$$y_k = \sum_{n=0}^{N-1} \sqrt{\frac{2}{N}} \sin\left(\frac{\pi \cdot (n+0.5) \cdot (k+0.5)}{N}\right) \cdot x_n,$$

DST Type-V (DST-5):

$$y_k = \sum_{n=0}^{N-1} \sqrt{\frac{2}{N+0.5}} \sin\left(\frac{\pi \cdot (n+1) \cdot (k+1)}{N+0.5}\right) \cdot x_n,$$

DST Type-VI (DST-6):

$$y_k = \sum_{n=0}^{N-1} \sqrt{\frac{2}{N+0.5}} \sin\left(\frac{\pi \cdot (n+0.5) \cdot (k+1)}{N+0.5}\right) \cdot x_n,$$

DST Type-VII (DST-7):

$$y_k = \sum_{n=0}^{N-1} \sqrt{\frac{2}{N+0.5}} \sin\left(\frac{\pi \cdot (n+1) \cdot (k+0.5)}{N+0.5}\right) \cdot x_n,$$

DST Type-VIII (DST-8):

$$y_k = \sum_{n=0}^{N-1} \sqrt{\frac{2}{N-0.5}} \sin\left(\frac{\pi \cdot (n+0.5) \cdot (k+0.5)}{N-0.5}\right) \cdot w_0 \cdot w_1 \cdot x_n,$$

where $$w_0 = \begin{cases} \frac{1}{\sqrt{2}}, & \text{if } n = N-1 \\ 1, & \text{otherwise} \end{cases}, w_1 = \begin{cases} \frac{1}{\sqrt{2}}, & \text{if } k = N-1 \\ 1, & \text{otherwise} \end{cases}$$

The above provides examples of different DCT and DST types, all-in-all there are 16 transform types. The transform type is specified by the mathematical formulation of the transform basis function. The transform type and the transform size should not be confused. The transform type refers to basis function, whereas the transform size refers to the size of the transform. For instance, a 4-point DST-VII and 8-point DST-VII have the same transform type, regardless of the value of N (e.g., 4-point or 8-point).

Without loss of generality, all the above transform types can be represented using the below generalized formulation:

$$y_m = \sum_{n=0}^{N-1} T_{m,n} \cdot x_n,$$

where T is the transform matrix specified by the definition of one certain transform, e.g., DCT Type-I~DCT Type-VIII, or DST Type-I~DST Type-VIII, and the row vectors of T, e.g., $[T_{i,0}, T_{i,1}, T_{i,2}, \ldots, T_{i,N-1}]$ are the $i^{th}$ transform basis vectors. A transform applied on the N-point input vector is called an N-point transform.

It is also noted that, the above transform formulations, which are applied on the 1-D input data x, can be represented in matrix multiplication form as below $$y = T \cdot x$$

where T indicates the transform matrix, x indicates the input data vector, and y indicates the output transform coefficients vector.

For instance, the video encoder may perform the matrix multiplication $y = T \cdot x$ to generate the transform coefficient vector. The video decoder may perform the inverse matrix multiplication to generate the transform vector from the transform coefficient vector.

The transforms as introduced above are applied on 1-D input data, and transforms can be also extended for 2-D input data sources. Supposing X is an input M×N data array. The typical methods of applying transform on 2-D input data include the separable and non-separable 2-D transforms.

A separable 2-D transform applies 1-D transforms for the horizontal and vertical vectors of X sequentially, formulated as below:

$$Y = C \cdot X \cdot R^T$$

where C and R denotes the given M×M and N×N transform matrices, respectively.

From the formulation, it can be seen that C applies 1-D transforms for the column vectors of X, while R applies 1-D transforms for the row vectors of X In the later part of this disclosure, for simplicity denote C and R as left (vertical) and right (horizontal) transforms, which both form a transform pair. There are cases when C is equal to R and is an orthogonal matrix. In such a case, the separable 2-D transform is determined by just one transform matrix.

A non-separable 2-D transform first reorganized all the elements of X into a single vector, namely X', by doing the following mathematical mapping as an example:

$$X'_{(i \cdot N + j)} = X_{i,j}$$

Then a 1-D transform T' is applied for X' as below:

$$Y = T' \cdot X$$

where T' is an (M*N)×(M*N) transform matrix.

In video coding, separable 2-D transforms are typically applied, because separarable 2-D transforms typically use fewer operations (addition, multiplication) counts as compared to 1-D transform. As described in more detail below, this disclosure describes example techniques with which a video encoder and a video decoder determine the left and right transforms.

For instance, the video encoder and the video decoder may determine a plurality of transform subsets, each transform subset identifying a plurality of candidate transforms. As an example of the 16 possible transforms (e.g., DCT-1 to DCT-8 and DST-1 to DST-8), the video encoder and the video decoder may determine three transform subsets and each of the transform subsets includes two or more of the 16 transforms. The video encoder and the video decoder may select one of the three transform subsets and determine the left transform (e.g., C) from the selected transform subset and select one of the three transform subsets and determine the right transform (e.g., R) from the selected transform subset. The selected transform subsets may be different subsets or the same subsets.

The transform efficiency can be measured by different criterions, one classical measurement is the definition of transform efficiency is the transform coding gain, as described below:

$$G_T = \frac{d(R)}{d^{XFORM}(R)} = \frac{\sigma_X^2}{\sqrt[N]{\prod_{n=0}^{N-1} \sigma_{Y_n}^2}} = \frac{\frac{1}{N}\sum_{n=0}^{N-1} \sigma_{Y_n}^2}{\sqrt[N]{\prod_{n=0}^{N-1} \sigma_{Y_n}^2}},$$

where $\sigma^2_{Y_n}$ is the variances of the transform coefficient Y(n). More examples may also be found at http://web.stanford.edu/class/ee398a/handouts/lectures/07-TransformCoding.pdf.

The following is a description of transform types applied in HEVC. In example video codecs, such as H.264/AVC, an integer approximation of the 4-point and 8-point Discrete Cosine Transform (DCT) Type-II is applied for both Intra and Inter prediction residual. Intra prediction residual refers to the residual from intra-prediction and Inter prediction residual refers to the residual from inter-prediction. The residual, inter-predication, and intra-prediction are all described in more detail below. In general, the residual block is divided into a plurality of transform blocks. In video encoding, the transforms are applied to each of the transform blocks to generate coefficient blocks. In video decoding, the transforms are applied to each of the coefficient blocks to generate the transform blocks and reconstruct the residual block.

To better accommodate the various statistics of residual samples, more flexible types of transforms other than DCT Type-II are utilized in newer generation video codecs. For example, in HEVC, an integer approximation of the 4-point Type-VII Discrete Sine Transform (DST) is utilized for Intra prediction residual, which is both theoretically proved and experimentally validated that DST Type-VII is more efficient than DCT Type-II for residuals vectors generated along the Intra prediction directions, e.g., DST Type-VII is more efficient than DCT Type-II for row residual vectors generated by the horizontal Intra prediction direction. See, for example, J. Han, A. Saxena and K. Rose, "Towards jointly optimal spatial prediction and adaptive transform in video/ image coding," IEEE International Conference on Acoustics, Speech and Signal Processing (ICASSP), March 2010, pp. 726-729.

In HEVC, an integer approximation of 4-point DST Type-VII is applied only for 4×4 luma Intra prediction residual blocks (luma intra prediction residual blocks are described in more detail below). The 4-point DST-VII used in HEVC is shown in FIG. 2A.

In HEVC, for residual blocks that are not 4×4 luma Intra prediction residual blocks, integer approximations of the 4-point, 8-point, 16-point and 32-point DCT Type-II are also applied. FIG. 2B illustrates an example of the 4-point DCT-II; FIG. 2C illustrates an example of the 8-point DCT-II; FIG. 2D illustrates an example of the 16-point DCT-II; and FIG. 2E illustrates an example of the 32-point DCT-II. FIGS. 2A-2E illustrate examples of differently sized DCTs of type II, and like FIGS. 2A-2E, there are examples of N-point DCTs and DSTs of different types.

As described above, a CU includes one or more TUs. The following describes transform scheme based on residual quadtree in HEVC. To adapt the various characteristics of the residual blocks, a transform coding structure using the residual quadtree (RQT) is applied in HEVC, which is briefly described in http://www.hhi.fraunhofer.de/fields-of-competence/image-processing/research-groups/image-video-coding/hevc-high-efficiency-video-coding/transform-coding-using-the-residual-quadtree-rqt.html.

As described above, each picture is divided into CTUs, which are coded in raster scan order for a specific tile or slice. A CTU is a square block and represents the root of a quadtree, i.e., the coding tree. The CTU size may range from 8×8 to 64×64 luma samples, but typically 64×64 is used. Each CTU can be further split into smaller square blocks called coding units (CUs). After the CTU is split recursively into CUs, each CU is further divided into prediction units (PU) and transform units (TU). The partitioning of a CU into TUs is carried out recursively based on a quadtree approach, therefore the residual signal of each CU is coded by a tree structure namely, the residual quadtree (RQT). The RQT allows TU sizes from 4×4 up to 32×32 luma samples.

Figure 3:
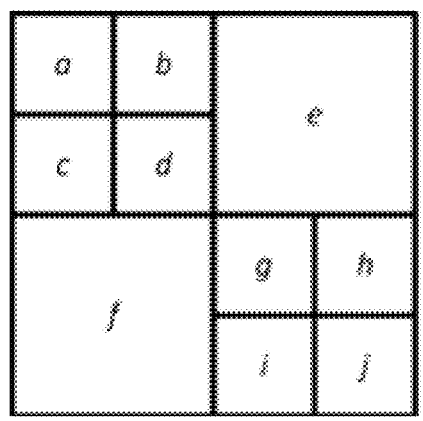
FIG. 3 is a conceptual diagram illustrating an example of a transform scheme based on residual quadtree in high efficiency video coding (HEVC).
Figure 3:
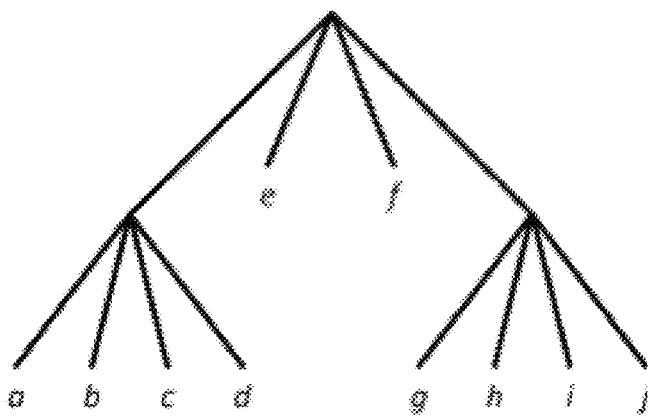

FIG. 3 shows an example where a CU includes 10 TUs, labeled with the letters "a" to "j," and the corresponding block partitioning. Each node of the RQT is actually a transform unit (TU). The individual TUs are processed in depth-first tree traversal order, which is illustrated in FIG. 3 as alphabetical order, which follows a recursive Z-scan with depth-first traversal. The quadtree approach enables the adaptation of the transform to the varying space-frequency characteristics of the residual signal. Typically, larger transform block sizes, which have larger spatial support, provide better frequency resolution. However, smaller transform block sizes, which have smaller spatial support, provide better spatial resolution. The trade-off between the two, spatial and frequency resolutions, is chosen by the encoder mode decision (e.g., by video encoder 20), for example, based on rate-distortion optimization technique. The rate-distortion optimization technique calculates a weighted sum of coding bits and reconstruction distortion, i.e., the rate-distortion cost, for each coding mode (e.g., a specific RQT splitting structure), and select the coding mode with least rate-distortion cost as the best mode.

Three parameters are defined in the RQT: the maximum depth of the tree, the minimum allowed transform size, and the maximum allowed transform size. The minimum and maximum transform sizes can vary within the range from 4×4 to 32×32 samples, which correspond to the supported block transforms mentioned in the previous paragraph. The maximum allowed depth of the RQT restricts the number of TUs. A maximum depth equal to zero means that a CB (coding block) cannot be split any further if each included TB (transform block) reaches the maximum allowed transform size, e.g., 32×32.

All these parameters interact and influence the RQT structure. Consider a case, in which the root CB size is 64×64, the maximum depth is equal to zero and the maximum transform size is equal to 32×32. In this case, the CB has to be partitioned at least once, since otherwise it would lead to a 64×64 TB, which is not allowed. In HEVC, larger size transforms, e.g., 64×64 transforms, are not adopted mainly due to its limited benefit considering and relatively high complexity for relatively smaller resolution videos.

The RQT parameters, i.e., maximum RQT depth, minimum and maximum transform size, are transmitted in the bitstream at the sequence parameter set level. Regarding the RQT depth, different values can be specified and signaled for intra and inter coded CUs (i.e., intra-predicted encoded CUs or inter-predicted decoded CUs or intra-predicted encoded CUs or inter-predicted CUs).

The quadtree transform is applied for both Intra and Inter residual blocks. Typically, the DCT-II transform of the same size of the current residual quadtree partition is applied for a residual block. However, if the current residual quadtree block is 4×4 and is generated by Intra prediction, the above 4×4 DST-VII transform is applied.

Figure 4:
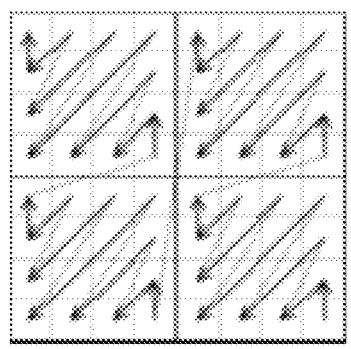
FIG. 4 is a conceptual diagram illustrating an example of a coefficient scan based on coding group in HEVC.

The following describes coefficient coding in HEVC. Regardless of the TU size, the residual of the transform unit is coded with non-overlapped coefficient groups (CG), and each contains the coefficients of a 4×4 block of a TU. For example, a 32×32 TU has totally 64 CGs, and a 16×16 TU has totally 16 CGs. The CGs inside a TU are coded according to a certain pre-defined scan order. When coding each CG, the coefficients inside the current CG are scanned and coded according to a certain pre-defined scan order for 4×4 block. FIG. 4 illustrates the coefficient scan for an 8×8 TU containing 4 CGs.

For each color component, one flag may be firstly signaled to indicate whether current transform unit has at least one non-zero coefficient. If there is at least one non-zero coefficient, the position of the last significant coefficient in the coefficient scan order in a transform unit is then explicitly coded with a coordination relative to the top-left corner of the transform unit. The vertical or horizontal component of the coordination is represented by its prefix and suffix, wherein prefix is binarized with truncated rice (TR) and suffix is binarized with fixed length.

The value of last_sig_coeff_x_prefix specifies the prefix of the column position of the last significant coefficient in scanning order within a transform block. The values of last_sig_coeff_x_prefix shall be in the range of 0 to (log2TrafoSize<<1)−1, inclusive.

The value of last_sig_coeff_y_prefix specifies the prefix of the row position of the last significant coefficient in scanning order within a transform block. The values of last_sig_coeff_y_prefix shall be in the range of 0 to (log2TrafoSize<<1)−1, inclusive.

The value of last_sig_coeff_x_suffix specifies the suffix of the column position of the last significant coefficient in scanning order within a transform block. The values of last_sig_coeff_x_suffix shall be in the range of 0 to (1<< ((last_sig_coeff_x_prefix>>1)−1))−1, inclusive.

The column position of the last significant coefficient in scanning order within a transform block LastSignificantCoeffX is derived as follows:

If last_sig_coeff_x_suffix is not present, the following applies:
LastSignificantCoeffX =last_sig_coeff_x_prefix
Otherwise (last_sig_coeff_x_suffix is present), the following applies:
LastSignificantCoeffX=(1<<((last_sig_coeff_x_prefix>>1)−1))*(2+(last_sig_coeff_x_prefix & 1))+last_sig_coeff_x_suffix The value of last_sig_coeff_y_suffix specifies the suffix of the row position of the last significant coefficient in scanning order within a transform block. The values of last_sig_coeff_y_suffix shall be in the range of 0 to (1<<((last_sig_coeff_y_prefix>>1)−1))−1, inclusive.

The row position of the last significant coefficient in scanning order within a transform block LastSignificantCoeffY is derived as follows:
If last_sig_coeff_y_suffix is not present, the following applies:
LastSignificantCoeffY=last_sig_coeff_y_prefix
Otherwise (last_sig_coeff_y_suffix is present), the following applies:
LastSignificantCoeffY=(1<<((last_sig_coeff_y_prefix>>1)−1))*(2+(last_sig_coeff_y_prefix & 1))+last_sig_coeff_y_suffix When the value of scanIdx is equal to 2, the coordinates are swapped as follows: (LastSignificantCoeffX, LastSignificantCoeffY)=Swap(LastSignificantCoeffX, LastSignificantCoeffY)

With such a position coded and also the coefficient scanning order of the CGs, one flag is further signaled for CGs except the last CG (in scanning order), which indicates whether it contains non-zero coefficients. For those CGs that may contain non-zero coefficients, significant flags, absolute values of coefficients and sign information may be further coded for each coefficient according to the pre-defined 4×4 coefficient scan order.

As described above, the techniques described in this disclosure describe ways to determine the transform that video encoder 20 applies to convert a transform block to a coefficient block and ways to determine the transform that video decoder 30 applies (e.g., as an inverse transform) to convert a coefficient block to a transform block. The following describes multiple transform for intra and inter prediction residual (e.g., different transform types for when the residual block is generated from intra-prediction and for when the residual block is generated from inter-prediction).

In some cases, despite the fact that DST Type-VII can efficiently improve the intra coding efficiency compared to the conventional DCT Type-II, the transform efficiency is relatively limited because prediction residuals present various statistics, and fixed usage of DCT Type-II and DST Type-VII cannot efficiently adapt to all the possible cases. Some techniques have been proposed to adapt to different cases.

In S.-C. Lim, D.-Y. Kim, S. Jeong, J. S. Choi, H. Choi, and Y.-L. Lee, "Rate-distortion optimized adaptive transform coding," Opt. Eng., vol. 48, no. 8, pp. 087004-1-087004-14, August 2009, a new transform scheme which adaptively employs integer version of DCT or DST for prediction residue is proposed, for each block it is signaled whether the DCT or DST transform is used for the prediction residue. In Y. Ye and M. Karczewicz, "Improved H.264 intra coding based on bidirectional intra prediction, directional transform, and adaptive coefficient scanning," in Proc. 15th IEEE Int. Conf. Image Process., October 2008, pp. 2116-2119, it has been proposed that each Intra prediction mode can be mapped to a unique pair of transform (C and R), a pre-defined as KLT pair, so that mode dependent transform (MDDT) applies. This way, different KLT transforms can be used for different Intra prediction modes; however, which transform to be used is predefined and dependent on the intra prediction mode.

In X. Zhao, L. Zhang, S. W. Ma, and W. Gao, "Video coding with rate-distortion optimized transform," IEEE Trans. Circuits Syst. Video Technol., vol. 22, no. 1, pp. 138-151, January 2012, however, more transforms can be used and an index to the transforms from a pre-defined set of transform candidates which are derived from off-line training process is explicitly signaled. Similar to MDDT, each Intra prediction direction may have its unique set of pairs of transforms. An index is signaled to specify which transform pair is chosen from the set. For example, there are up to four vertical KLT transforms and up to four horizontal KLT transforms for smallest block sizes 4×4; therefore 16 combinations may be chosen. For larger block sizes, less number of combinations are used. The proposed method in "Video coding with rate-distortion optimized transform" applies to both Intra and Inter prediction residual. For Inter prediction residual, up to 16 combinations of KLT transforms can be chosen and the index to one of the combinations (four for 4×4 and sixteen for 8×8) is signaled for each block.

In A. Saxena and F. Fernandes, "DCT/DST-based transform coding for intra prediction in image/video coding," IEEE Trans. Image Processing and C. Yeo, Y. H. Tan, Z. Li, and S. Rahardj a, "Mode-dependent transforms for coding directional intra prediction residuals," IEEE Trans. Circuits Syst. Video Technol., vol. 22, no. 4, pp. 545-554, 2012, multiple transforms are used; however, instead of using KLT transforms (which typically need to be trained), either DCT (DCT-II) or DST (DST-VII) is used for a transform unit (with both left and right transforms (e.g., C and R) being the same) and which one to be used is determined by a signaled flag. In F. Zou, O. C. Au, C. Pang, J. Dai, and F. Lu, "Rate-Distortion Optimized Transforms Based on the Lloyd-Type Algorithm for Intra Block Coding ," IEEE Journal of Selected Topics in Signal Processing, Volume: 7, Issue: 6, November 2013, several pre-defined KLT transform pairs are used, and an index to a transform pair is signaled (instead of derived) for a coding unit, so that each transform unit of the coding unit uses the same pair of transforms.

In J. An, X. Zhao, X. Guo and S. Lei, "Non-CE7: Boundary-Dependent Transform for Inter-Predicted Residue," JCTVC-G281, multiple transforms are chosen for inter predicted residual of TUs according to their locations within a CU. Both the C and R transforms are chosen from DST-VII and the flipped version of DST-VII. Therefore, up to four combinations are possible for the TUs within a CU. However, since the combination is fully determined by the location of the PUs, there is no need to signal which combination is being used.

Aspects of enhanced multiple transform (EMT) will now be described. In JEM, EMT (also sometimes referred to as Adaptive Multiple Transform, i.e., AMT) is proposed for residual coding for both inter and intra coded blocks. Aspects of this EMT scheme are described in U.S. patent application Ser. No. 15/005,736, filed 25 Jan. 2016. EMT utilizes multiple selected transforms from the DCT/DST families other than the current transforms in HEVC. The newly introduced transform matrices are DST-VII, DCT-VIII, DST-I and DCT-V. The following tables show the basis functions of the selected DST/DCT In order to keep the orthogonality of the transform matrix, the transform matrixes are quantized more accurately than the transform matrixes in HEVC. To keep the intermediate values of the transformed coefficients within the range of 16-bit, after horizontal and after vertical transform, all the coefficients are right shifted by 2 more bits, comparing to the right shift used in the current HEVC transforms.

The AMT applies to the CUs with both width and height smaller than for equal to 64, and whether AMT applies or not is controlled by a CU level flag. When the CU level flag is equal to 0, DCT-II is applied in the CU to encode the residue. For luma coding block within an AMT enabled CU, two additional flags are signaled to identify the horizontal and vertical transform to be used.

For intra residue (residual) coding, due to the different residual statistics of different intra prediction modes, a mode-dependent transform candidate selection process is used. Three transform sub-sets have been defined as shown in Table 1, and the transform subset is selected based on the intra prediction mode, as specified in Table 2.

TABLE 1

Three pre-defined transform candidate sets

| Transform Set | Transform Candidates |
|---|---|
| 0 | DST-VII, DCT-VIII |
| 1 | DST-VII, DST-I |
| 2 | DST-VII, DCT-VIII |

With the sub-set conception, a transform subset is first identified based on Table 1 using the Intra prediction mode of a CU with the CU-level AMT flag is equal to 1. After that, for each of the horizontal and vertical transform, one of the two transform candidates in the identified transform subset, according to in Table 2, is selected based on explicitly signaled with lag.

TABLE 2

Selected (H)orizontal and (V)ertical transform sets for each Intra prediction mode

| | Intra Mode | | | | | | | | | | | | | | | | | |
|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 |
| H | 2 | 1 | 0 | 1 | 0 | 1 | 0 | 1 | 0 | 0 | 0 | 0 | 0 | 1 | 0 | 1 | 0 | 1 |
| V | 2 | 1 | 0 | 1 | 0 | 1 | 0 | 1 | 2 | 2 | 2 | 2 | 2 | 1 | 0 | 1 | 0 | 1 |

| | Intra Mode | | | | | | | | | | | | | | | | | |
|---|---|---|---|---|---|---|---|---|---|---|---|---|---|---|---|---|---|---|
| | 18 | 19 | 20 | 21 | 22 | 23 | 24 | 25 | 26 | 27 | 28 | 29 | 30 | 31 | 32 | 33 | 34 | |
| H | 0 | 1 | 0 | 1 | 0 | 1 | 2 | 2 | 2 | 2 | 2 | 1 | 0 | 1 | 0 | 1 | 0 | |
| V | 0 | 1 | 0 | 1 | 0 | 1 | 0 | 0 | 0 | 0 | 0 | 1 | 0 | 1 | 0 | 1 | 0 | |

For inter prediction residual, however, only one transform set, which consists of DST-VII and DCT-VIII, is used for all inter modes and for both horizontal and vertical transforms.

Figure 5:
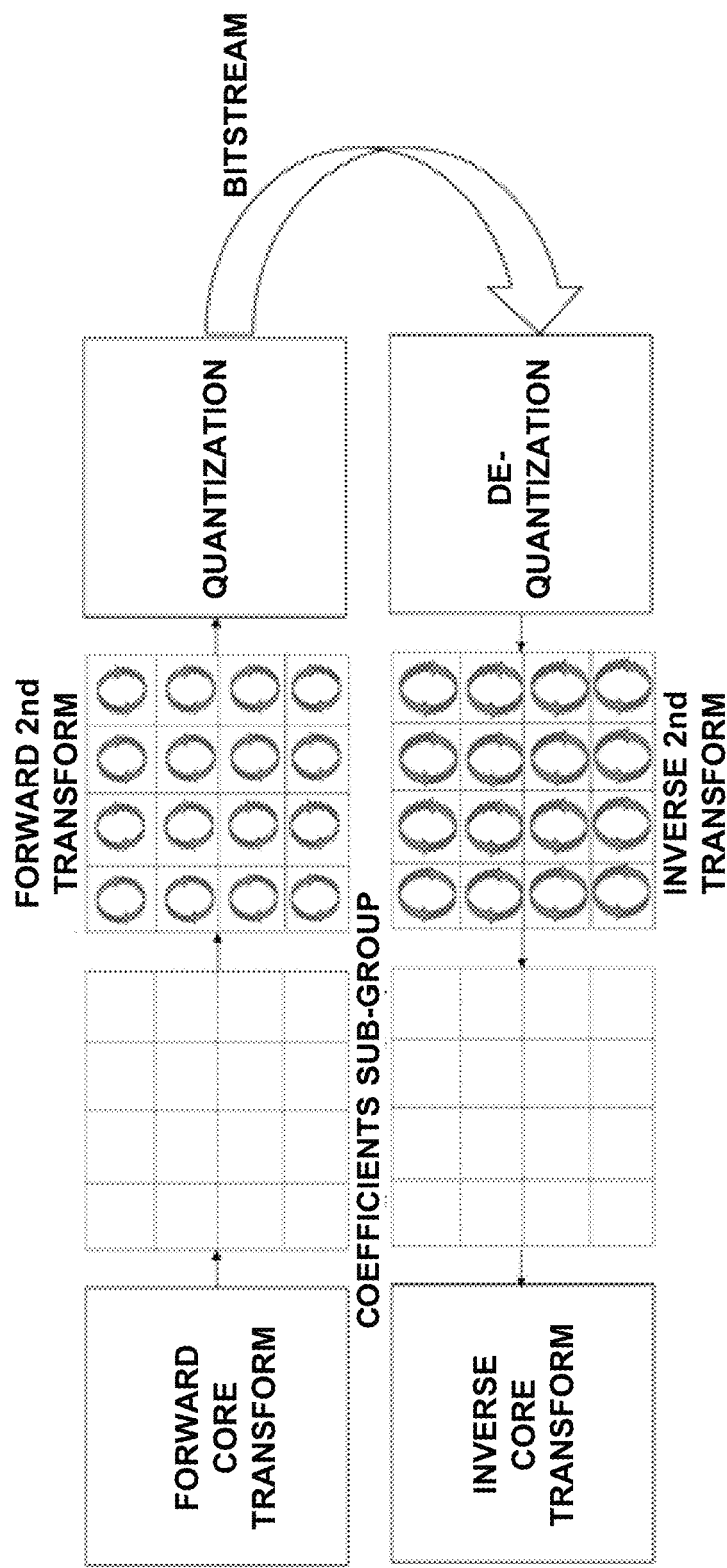
FIG. 5 shows an example of a secondary transform.

Aspects of non-separable secondary transforms (NSSTs) will now be described. In JEM, a mode dependent NSST is applied between forward core transform and quantization (at encoder) and between de-quantization and inverse core transform (at decoder side). Aspects of mode dependent NSST (MDNSST) are described in U.S. patent applications Ser. Nos. 15/270,455 and 15/270,507, both filed 20 Sep. 2016. FIG. 5 shows an example of a secondary transform. As shown in FIG. 5, MDNSST is performed independently for each 4×4 sub-group of transform coefficients within an intra-coded CU and is applied only in Intra CU.

Application of a non-separable transform is described as follows using input as an example. To apply the non-separable transform, the 4×4 input block X $$X = \begin{bmatrix} X_{00} & X_{01} & X_{02} & X_{03} \\ X_{10} & X_{11} & X_{12} & X_{13} \\ X_{20} & X_{21} & X_{22} & X_{23} \\ X_{30} & X_{31} & X_{32} & X_{33} \end{bmatrix} \quad (19)$$

is represented as a vector $\vec{X}$:

$$\vec{X} = [X_{00}\,X_{01}\,X_{02}\,X_{03}\,X_{10}\,X_{11}\,X_{12}\,X_{13}\,X_{20}\,X_{21}\,X_{22}\,X_{23}\,X_{30}\,X_{31}\,X_{32}\,X_{33}]^T \quad (20)$$

The non-separable transform is calculated as $\vec{F} = T \cdot \vec{X}$, where $\vec{F}$ indicates the transform coefficient vector, and T is a 16×16 transform matrix. The 16×1 coefficient vector $\vec{F}$ is subsequently re-organized as 4×4 block using the scanning order for that block (horizontal, vertical or diagonal). The coefficients with smaller index may be placed with the smaller scanning index in the 4×4 coefficient block.

There are totally 11×3(for directional modes)6+1×2(for non-directional modes) non-separable transform matrices, where 11 is the number of transform sets for the directional intra prediction mode and each transform set includes 3 transform matrices. While for non-directional modes, i.e., Planar, DC and LM, only one transform set is applied which includes 2 transform matrices. The mapping from the intra prediction mode to the transform set is defined in Table 3. The transform set applied to luma/chroma transform coefficients is specified by the corresponding luma/chroma intra prediction modes, according to Table 3.

For each transform set, the selected non-separable secondary transform candidate is further specified by the explicitly signalled CU-level MDNSST index. The index is signalled in a bit-stream once per Intra CU after transform coefficients and truncated unary banalization is used. The truncated value is 2 in case of planar or DC mode, and 3 for angular intra prediction mode. This MDNSST index is signalled only when there is more than one non-zero coefficient in a CU. The default value is zero when a value is not signalled. Zero value of this syntax element indicates secondary transform is not applied to the current CU, values 1-3 indicates which secondary transform from the set should be applied.

In JEM, MDNSST is not applied for a block coded with transform skip mode. When MDNSST index is signalled for a CU and not equal to zero, MDNSST shall not be used for a block of a component that is coded with transform skip mode in the CU. When a CU with blocks of all components coded in transform skip mode, MDNSST index is not signalled for the CU.

TABLE 8

Mapping from intra prediction mode to transform set index

| luma intra mode | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| transform set index | 0 | 0 | 1 | 2 | 1 | 2 | 1 | 2 | 3 | 4 | 3 | 4 | 3 | 4 | 5 | 5 | 5 | 6 |

| luma intra mode | 18 | 19 | 20 | 21 | 22 | 23 | 24 | 25 | 26 | 27 | 28 | 29 | 30 | 31 | 32 | 33 |
|---|---|---|---|---|---|---|---|---|---|---|---|---|---|---|---|---|
| transform set index | 6 | 6 | 7 | 7 | 7 | 8 | 9 | 8 | 9 | 8 | 9 | 10 | 11 | 10 | 11 | 10 |

| luma intra mode | 34 | 35 | 36 | 37 | 38 | 39 | 40 | 41 | 42 | 43 | 44 | 45 | 46 | 47 | 48 | 49 | 50 | 51 |
|---|---|---|---|---|---|---|---|---|---|---|---|---|---|---|---|---|---|---|
| transform set index | 11 | 10 | 11 | 10 | 11 | 10 | 9 | 8 | 9 | 8 | 9 | 8 | 7 | 7 | 7 | 6 | 6 | 6 |

| luma intra mode | 52 | 53 | 54 | 55 | 56 | 57 | 58 | 59 | 60 | 61 | 62 | 63 | 64 | 65 | 66 | 67 (LM) |
|---|---|---|---|---|---|---|---|---|---|---|---|---|---|---|---|---|
| transform set index | 5 | 5 | 5 | 4 | 3 | 4 | 3 | 4 | 3 | 2 | 1 | 2 | 1 | 2 | 1 | 0 |

At encoder side, CU level RD checks are used to select the NSST index for a CU. That is, for an intra-coded CU, the CU level RD check is looped four time by using NSST index value as loop index. To accelerate encoder speed, early stop of the loop is applied. The RD check for a NSST index with larger value is skipped when there is no non-zero transformed coefficients in the current CU for a NSST index with smaller value.

Aspects of signal-dependent transform (SDT) will now be described. As described in C. Lan, et al. "Exploiting non-local correlation via signal-dependent transform (SDT)." IEEE Journal of Selected Topics in Signal Processing 5.7 (2011): 1298-1308, considering that there are many similar patches within a frame and across frames, SDT explores such correlations can enhance coding performance by means of KLT. This trained KLT plays the role of transform which intends to compact the energy more efficiently. In this context a patch refers to a block of video data. A patch, however, does not necessarily have a one-to-one correspondence with a signalled partition, such as a CU, PU, or TU, of the video data. A patch may, for example, only partially overlap a CU, PU, or TU, or may overlap some or all of multiple CUs, PUs, or TUs.

Figure 6:
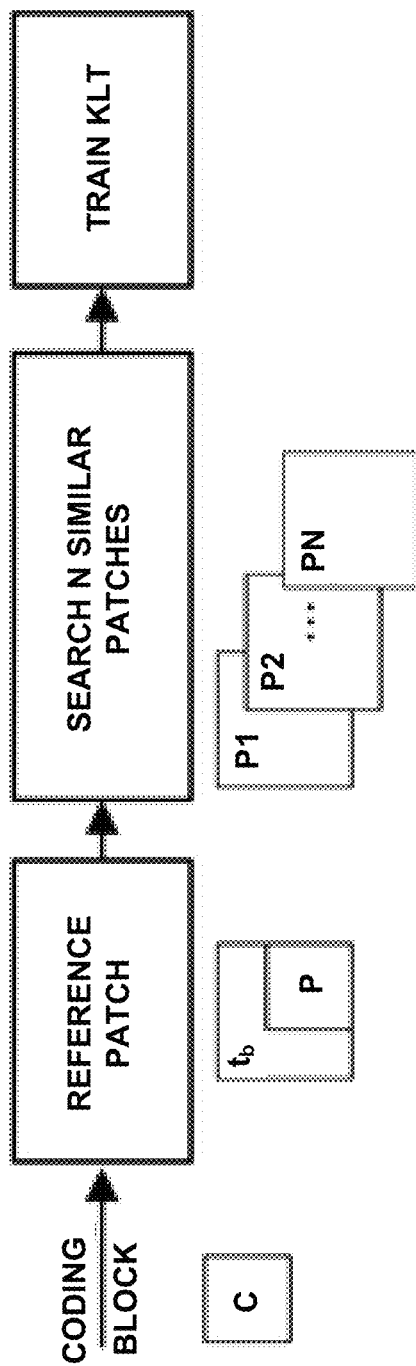
FIG. 6 shows an example of a flowchart of KLT process.

FIG. 6 shows an example of a flowchart of KLT exploring the non-local correlations. The flowchart in FIG. 6 describes this idea. For the current coding block indicated by C, at first, a reference patch R which consists of the reconstructed left-up template $t_L$ and the prediction block p of the coding block is obtained. Then, this reference patch is used to search for N most similar patches over the reconstructed regions. Finally, one-dimensional KLT based on these blocks and prediction block is calculated. The coding block is unknown at the decoder for the collection of similar candidate blocks. The prediction block and the reconstructed template are used to guide the searching of similar blocks instead of using the original block. This tool is used for various block sizes 4×4, 8×8, 16×16 and 32×32.

Karhunen-Loéve transform (KLT) is considered to be an optimal transform from the energy compaction efficiency. By searching over the reconstructed regions, N blocks $x_i$, i=1, 2, ..., N, which are most similar to the reference patch are obtained. Here, $x_i=(x_{i1}, x_{i2}, ..., x_{iD})^T$ and D indicates the vector dimension which is the transform block size. For an example, for 4×4 coding block, N is 16. The prediction p from those blocks is subtracted and obtain the residual blocks as $u_i$, i=1, 2, ..., N, where $u_i=(x_i-p)/\sqrt{N}$. The, these residual blocks are used as the training samples with zero mean for the KLT derivation. These N training samples can be represented by $U=(u_1, u_2, ..., u_N)$, which is an D×N matrix. The covariance matrix $\Sigma$ can be indicated as:

$$\Sigma = UU^T \qquad (1)$$

where the dimension of this covariance matrix is D×D. KLT bases are then the eigenvectors of this covariance matrix. For natural image/video contents, the selection of the candidate number N as 100 may be sufficient for good performance.

The computation complexity for the eigenvalue decomposition is $O(D^3)$. For 4×4 block with D being 16, the complexity is $O(16^3)$, which is acceptable. For a large block, the complexity may be very high. For 32×32 block with D being 1024, the time complexity may, for example, be 262144 times slower than that for 4×4 block, being potentially intolerable in the coding framework.

In considering this, a fast algorithm is utilized to make the large block size KLT feasible. The dimension of $\Sigma$ is D×D. However, $U^TU$ has a much lower dimension as N×N. The eigenvectors $\phi$ of $\Sigma'=U^TU$, which satisfy the equation may be calculated as:

$$U^TU\phi = \phi\Lambda \qquad (22)$$

$\phi$ indicates the eigenvector matrix while $\Lambda$ denotes the diagonal matrix with the eigenvalues being the diagonal elements. Both sides of equation (2) can be multiplied by U to get:

$$UU^TU\phi = U\phi\Lambda \qquad (23)$$

Adding brackets to this equation obtains:

$$(UU^T)(U\phi)=(U\phi)\Lambda \quad (24)$$

The column vectors of $U\phi$ are the eigenvectors of $UU^T$ with their corresponding eigenvalues being the diagonal elements of matrixes $\Lambda$. Let $\varphi=U\phi$. This indicates the eigenvectors of the high dimensional covariance matrix $U^TU$ can be obtained by multiplying U with the eigenvectors $\phi$ which are obtained from the low dimensional covariance matrix $U^TU$. The dimensions of $\varphi$ and $\Lambda$ are both D×N. All the other (D−N) eigenvectors of $UU^T$ have zero eigenvectors. Schmidt orthogonalization may be used to fill these (D−N) eigenvectors to get D×D eigenvector matrix.

To reduce the complexity for matrix multiplication, one can use the obtained N eigenvectors to perform KLT transform, leaving the remaining (D−N) transform coefficients as zeros. This may not attenuate the performance since the first N projections can cover the most of the signal energy while the bases are trained from samples being highly correlated with the coding block.

The described KLT is implemented at the block level on the coding block in JEM. To have high adaptability to the image/video contents, the proposed scheme supports the proposed KLT on 4×4, 8×8, 16×16 and 32×32 coding blocks. At JEM encoder side, rate-distortion optimization is utilized to determine the best transform mode among the SDT and the advanced multiple transform (AMT). The described KLT method is included into JEM, but due to the drastic high complexity, this method is disabled by default.

Existing techniques for signalling transforms may exhibit some problems. As one example, for the above described AMT method applied on an inter coded block, namely "inter AMT," up to 3 bits overheads need to be signaled per block to indicate which transform is actually applied, which is very expensive for inter coding. If the overhead bits are saved with similar efficiency on transform selection, overall coding performance may be improved. As another example of a potential problem, for the above described SDT, the coder complexity needed for implementation may be too high due to the need for both extensive decoder searches on similar image patches and extensive calculations to derive the KLT matrices. If the idea of on-line updating transform functions using similar image patches is utilized, but in a lower complexity, this technique may be more practical to implement with existing hardware. As another example of a potential problem, there is temporal statistical correlation between an image block in the current picture and another block in another picture which is close to the current picture in terms of time distance that is not currently utilized. This temporal statistical correlation may be utilized to select or derive a transform for further improvement of coding efficiency. This disclosure introduces techniques that may address the various problems described above. To potentially resolve the problems mentioned above, this disclosure proposes the following techniques. Some of the techniques described may also be applied to both intra-coded and inter-coded blocks.

The following techniques may be applied individually, or in any combination, by video encoder 20 and video decoder 30. Video encoder 20 and video decoder 30 may, for example, be configured to determine a characteristic of a predictive block of a current block of a current picture and identify a transform for decoding the current block based on the characteristic. As will be explained in greater detail below, the characteristic of the predictive block may, for example, be values of neighboring reconstructed samples of the current block, the presence of an edge in the predictive block, an amount of variance in the predictive block, an edge direction in the predictive block, a coding mode of the predictive block, an adaptive loop filter classification for the predictive block, or some other such characteristic of the predictive block. As will be explained in greater detail below, video encoder 20 and video decoder 30 can use these characteristics in various manners to determine one or more transforms for a current block of video data.

According to one example technique, one or several image/video (either reconstructed or residual) blocks (patches) that have some similarity with the current block are searched and located by both video encoder 20 and video decoder 30. The located blocks are used to identify one or multiple transform candidates (transform subset) from a group of pre-defined transform candidates, e.g., DCT/DST transforms with different types, or a set of pre-defined KLTs. The identified one transform is applied as the transform on the current residual block, or one of the multiple identified transform is applied as the transform on the current residual block. As will be explained in more detail below, video encoder 20 may use the selected transform to transform a block of residual samples into transform coefficients. The transform applied by video encoder 20 may sometimes be referred to as a forward transform. Video decoder 30 may use the selected transform to inverse transform the transform coefficients into a block of residual samples.

The one or several image/video blocks may come from the decoded region of the current picture or may come from a reference pictures. The one or several image/video blocks may be derived by comparing their neighboring reconstructed pixels and the neighboring reconstructed pixels of current block, namely a template matching process.

Figure 7:
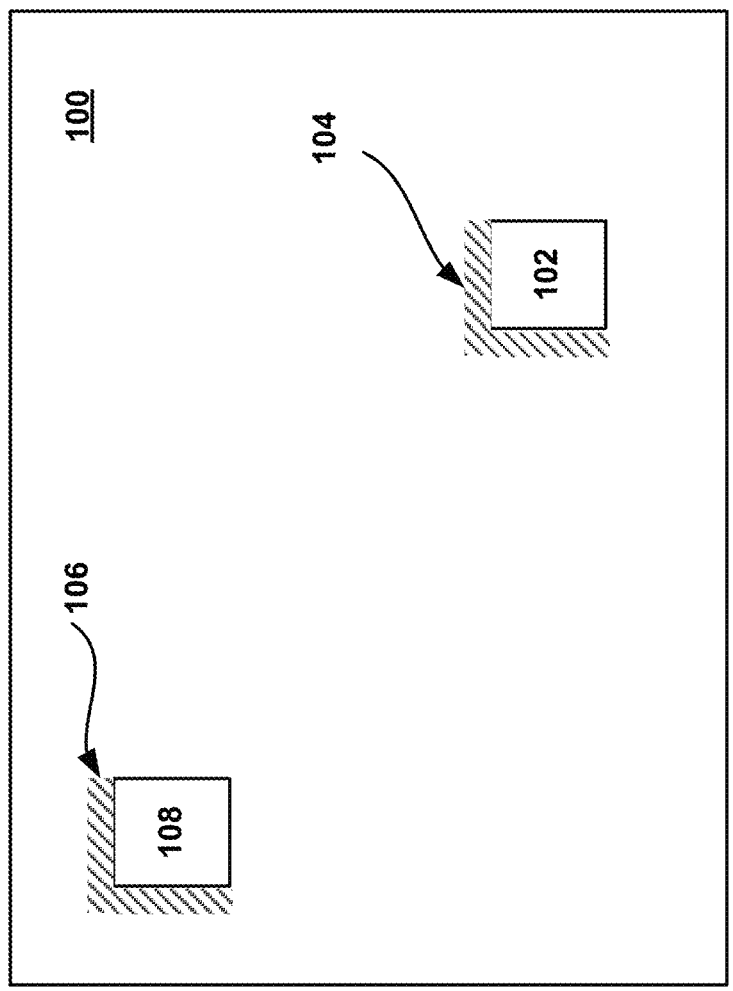
FIG. 7 shows an example of the template matching process that may be performed by video decoder 30 (or video encoder 20).

FIG. 7 shows an example of the template matching process that may be performed by video decoder 30 (or video encoder 20). Video decoder 30 is coding current picture 100, and more specifically, is coding current block 102. To determine a transform for a residual block of current block 102, video decoder 30 compares neighboring reconstructed samples 104 of current block 102 to other reconstructed samples in picture 100. Video decoder 30 finds a group of other reconstructed samples that most closely, or closely enough, matches reconstructed neighboring samples 104. In the example of FIG. 7, reconstructed samples 106 are the reconstructed samples that match reconstructed neighboring samples 104. Based on the location of reconstructed samples 106, video decoder 30 locates block 108. Using one of the various techniques described below, video decoder 30 uses block 108 to determine a transform for block 102. Although FIG. 7 shows reconstructed neighboring samples 106 and block 108 as being in the same picture as neighboring reconstructed samples 104 and current block 102, it should be noted that reconstructed neighboring samples 106 and block 108 may, in some examples, be found in reference pictures that are different than picture 100.

The one or several image/video blocks may be the prediction block(s) of the current block. Thus, instead of searching the 'similar' blocks, in this example, the video coder may directly use the prediction block of current block to identify the one or multiple transform candidates. In another example, the prediction block of the prediction block of the current block, i.e., the block from which the current block is predicted, may also be one of the similar image/video block used for transform identification. The identified transform can be either a separable transform, i.e., including both left (column) or right (row) transform, or a non-separable transform (e.g., the transform candidates from NSST).

Video encoder 20 and/or video decoder 30 can identify a transform by first performing each available transform candidate from a given transform subset on the one or several image/video blocks, and the transform with the best efficiency under a given criterion may be the identified transform to be applied to the current block. The criterion of transform efficiency can be Sum of absolute transformed coefficients value (SATC) after applying the transform candidate to the located image/video or residue blocks. Smaller SATC means higher transform efficiency. In another example, the criterion of transform efficiency can be the transform coding gain as described above and also as described at http://web.stanford.edu/class/ee398a/handouts/lectures/07-TransformCoding.pdf. In another example, the criterion of transform efficiency can be the sum of absolute values of several selected transform coefficients, e.g., the top-left 1, 2×2 or 4×4 low frequency coefficients, or the first/last N coefficients in coefficient scanning order, where N can be pre-defined values which may depend on block sizes.

Video encoder 20 and/or video decoder 30 can identify the transform by analyzing one or several image/video (or residual, or prediction) blocks using a given criterion, and according to the criterion a transform or multiple transforms (transform subset) is identified. In one example, the criterion may depend on an analysis process performed on the one or several image/video (or residual, or prediction) blocks. Examples of the analysis process, include but are not limited to edge detection (e.g., using Sobel operator), an amount of variance, or a coding mode used for the prediction block. According to the output of the analysis process, one or multiple transform candidates (transform subset) are identified, and the identified one transform, or one of the multiple identified transforms is used as the transform on the current residual block.

In another example, the criterion may be some available classification information which can be directly used to identify one or multiple transform candidates (transform subset). The available classification information may include, but not limited to the ALF (Adaptive Loop Filter) classification information applied on the image/video block located at the position of the prediction block. In this case, the relationship between the classification information and transforms may be pre-defined. For example, one or a subset of transforms may be selected based on the quantized Laplacian activity values, and/or the direction information (gradients along several directions).

In another example, instead of identifying only one transform candidate, video encoder 20 and/or video decoder 30 may identify a transform subset using the one or several image/video blocks, and the identified transform subset may include more than one transform candidate coming from a pre-defined set/group of transform candidates. In this case, an index, indicating which transform candidate of the identified transform subset is actually used for the current block, and the index may be explicitly signaled or implicitly derived using decoded information.

According to another example technique, video encoder 20 and/or video decoder 30 may use some coded information of the current block to identify one or multiple transforms (or a transform subset) from a pre-defined set/group of transforms. Such coded information may, for example, include, but is not limited to, block sizes, block width and/or height, block area size, the ratio of block width versus height, transform coefficients, motion information, Affine mode information, IC (Illumination Compensation) mode information, etc.

In one example, video encoder 20 and/or video decoder 30 may use the signaled transform coefficients to identify one or multiple transforms (or a transform subset) from a pre-defined set/group of transforms. Video encoder 20 and/or video decoder 30 can may, for example, identify the index of the selected transform candidate from a given transform subset based on the transform coefficients. The transform index may, however, not be explicitly signaled but, instead, may be hidden in the signaled transform coefficients. In one example, the selected transform candidate may be identified by checking the parity of some or all of the non-zero transforms. In another example, the selected transform candidate may be identified by checking the distribution of the transform coefficients, such as whether a non-zero coefficient occurs in a certain location (high-frequency, low-frequency) of the transform coefficient block.

In one example, the motion information can be used to identify one or multiple transforms (or a transform subset) from a pre-defined set/group of transforms. Video encoder 20 and/or video decoder 30 can may identify one or multiple transforms (or a transform subset) from a pre-defined set/group of transforms based on motion information. In one example, the selected transform(s) is (are) identified based on the magnitude of motion vector(s), such as different transforms are applied to different magnitude ranges. In another example, the selected transform(s) is (are) identified based on uni-prediction or bi-prediction. In another example, the selected transform(s) is (are) identified based on the direction(s) pointed by motion vector(s). In another example, the selected transform(s) is (are) identified based on the type of motion vector(s) (translational or affine motion).

According to another example technique, video decoder 30 may identify one or multiple transforms (or a transform subset) from a pre-defined set/group of transforms, and then video decoder 30 may receive a flag or index indicating if the identified one or multiple transforms (or a transform subset) is actually the selected one or multiple transforms (or a transform subset) used for the block. The flag/index may be included in the bitstream, and the flag/index may be entropy coded using context modeling which is derived by already coded information.

The one or multiple transforms (or a transform subset) may, for example, be identified by reconstructing the current block using each of available transform candidates with an already decoded transform coefficient block. The discontinuity between each reconstructed block and neighboring reconstructed block can be measured, and the one or multiple transforms (or a transform subset) may be identified by selecting one or multiple transforms which show the least discontinuity between their reconstructed block and neighboring reconstructed block.

In another example, video encoder 20 and/or video decoder 30 may identify the one or multiple transforms (or a transform subset) by reconstructing the current block using each available transform candidate with decoded transform coefficient block, and the difference between one (or several) line(s) of top and/or left border of each reconstructed block and those of the prediction block are calculated. The one or multiple transforms (or a transform subset) are identified by selecting one or multiple transforms which show the least difference. This technique may be applied to an intra predicted block or applied to the block using a certain intra mode, e.g. with directional intra prediction mode. In some implementations, only line(s) top or left border are used, based on direction of the intra prediction mode.

The context modeling for entropy coding the flag/index may depend on the levels (magnitude of transform coefficient) of the transform coefficient block, and the level values may come from one, sum of level values from selected transform coefficients, or sum of level values from all the transform coefficients, or sum of squared level values from all the transform coefficients. In another example, the context modeling for entropy coding the flag/index may depend on the last position of the transform coefficient block.

The above proposed techniques may be applied under certain conditions. For example, certain techniques may be invoked for a certain temporal level. In another example, certain techniques are invoked for a coding mode and/or block size.

Figure 8:
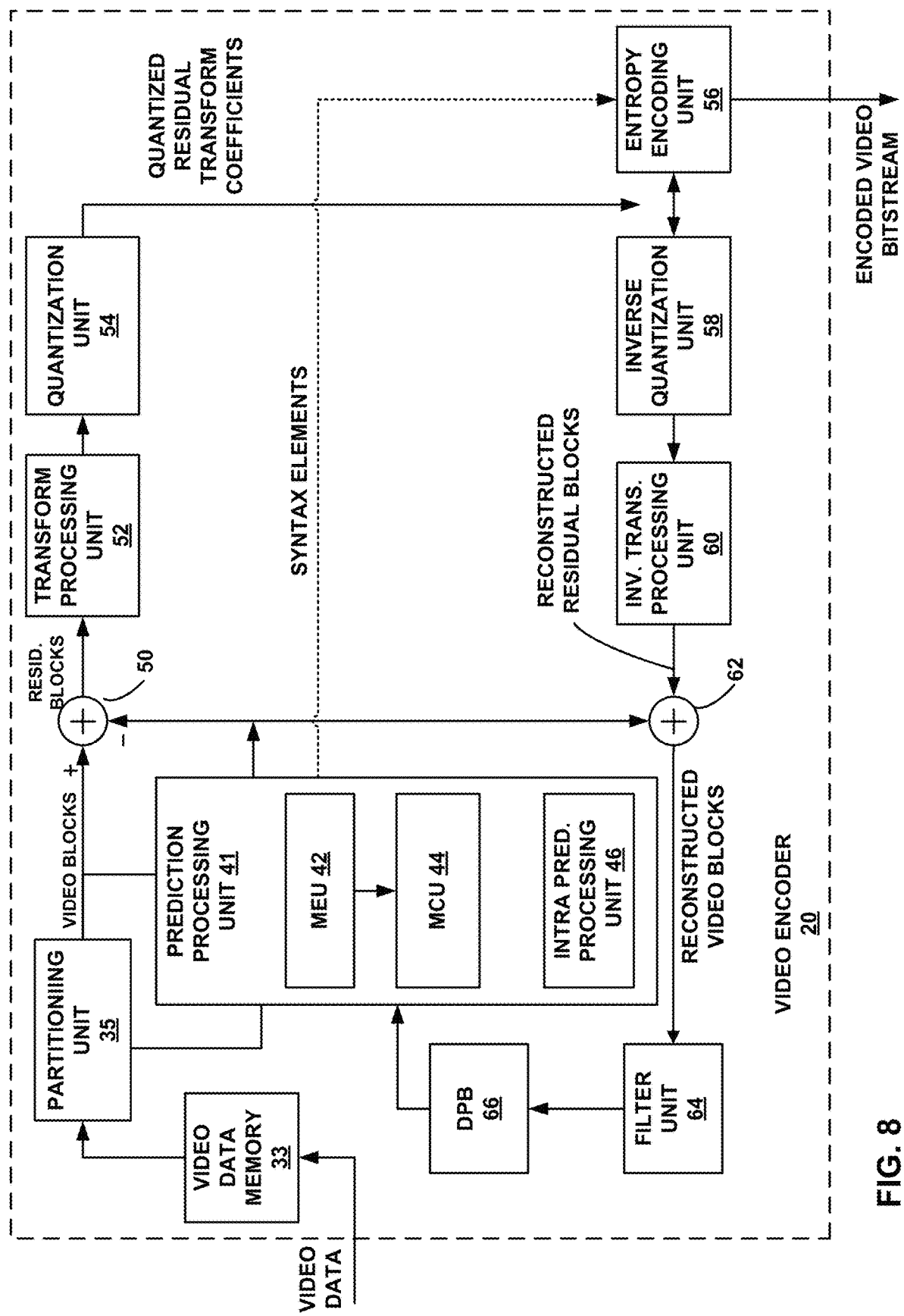
FIG. 8 is a block diagram illustrating an example video encoder that may implement the techniques described in this disclosure.

FIG. 8 is a block diagram illustrating an example video encoder 20 that may implement the techniques described in this disclosure. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

In the example of FIG. 8, video encoder 20 includes a video data memory 33, partitioning unit 35, prediction processing unit 41, summer 50, transform processing unit 52, quantization unit 54, entropy encoding unit 56. Prediction processing unit 41 includes motion estimation unit (MEU) 42, motion compensation unit (MCU) 44, and intra prediction unit 46. For video block reconstruction, video encoder 20 also includes inverse quantization unit 58, inverse transform processing unit 60, summer 62, filter unit 64, and decoded picture buffer (DPB) 66.

As shown in FIG. 8, video encoder 20 receives video data and stores the received video data in video data memory 33. Video data memory 33 may store video data to be encoded by the components of video encoder 20. The video data stored in video data memory 33 may be obtained, for example, from video source 18. DPB 66 may be a reference picture memory that stores reference video data for use in encoding video data by video encoder 20, e.g., in intra- or inter-coding modes. Video data memory 33 and DPB 66 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 33 and DPB 66 may be provided by the same memory device or separate memory devices. In various examples, video data memory 33 may be on-chip with other components of video encoder 20, or off-chip relative to those components.

Partitioning unit 35 retrieves the video data from video data memory 33 and partitions the video data into video blocks. This partitioning may also include partitioning into slices, tiles, or other larger units, as wells as video block partitioning, e.g., according to a quadtree structure of LCUs and CUs. Video encoder 20 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra coding modes or one of a plurality of inter coding modes, for the current video block based on error results (e.g., coding rate and the level of distortion). Prediction processing unit 41 may provide the resulting intra- or inter-coded block to summer 50 to generate residual block data and to summer 62 to reconstruct the encoded block for use as a reference picture.

Intra prediction unit 46 within prediction processing unit 41 may perform intra-predictive coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices or B slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in DPB 66. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in DPB 66. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in one of the reference picture lists. Video encoder 20 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by video decoder 30 in decoding the video blocks of the video slice.

After prediction processing unit 41 generates the predictive block for the current video block, either via intra prediction or inter prediction, video encoder 20 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. In another example, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding unit 56, the encoded bitstream may be transmitted to video decoder 30, or archived for later transmission or retrieval by video decoder 30. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within one of the reference picture lists. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed block.

Filter unit 64 filters the reconstructed block (e.g. the output of summer 62) and stores the filtered reconstructed block in DPB 66 for uses as a reference block. The reference block may be used by motion estimation unit 42 and motion compensation unit 44 as a reference block to inter-predict a block in a subsequent video frame or picture. Filter unit 64 filters the reconstructed video block using, for example, one or more of a deblocking filter, an adaptive loop filter (ALF), a sample adaptive offset (SAO) filter, or other types of filters. Other loop filters (either in the coding loop or after the coding loop) may also be used to smooth pixel transitions or otherwise improve the video quality.

Figure 9:
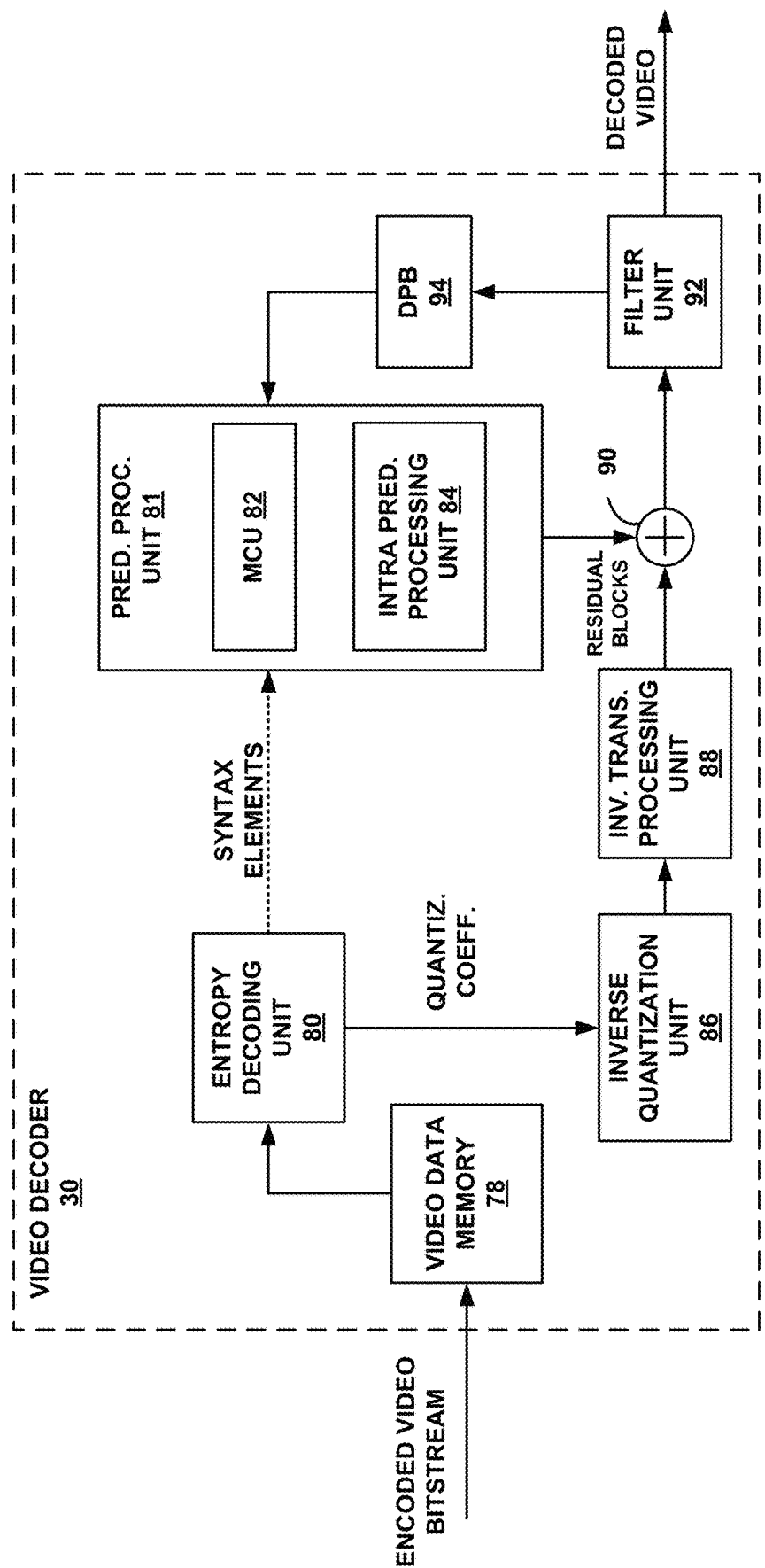
FIG. 9 is a block diagram illustrating an example video decoder that may implement the techniques described in this disclosure.

FIG. 9 is a block diagram illustrating an example video decoder 30 that may implement the techniques described in this disclosure. Video decoder 30 of FIG. 9 may, for example, be configured to receive the signaling described above with respect to video encoder 20 of FIG. 8. In the example of FIG. 9, video decoder 30 includes video data memory 78, entropy decoding unit 80, prediction processing unit 81, inverse quantization unit 86, inverse transform processing unit 88, summer 90, filter unit 92, and DPB 94. Prediction processing unit 81 includes motion compensation unit 82 and intra prediction unit 84. Video decoder 30 may, in some examples, perform a decoding pass generally reciprocal to the encoding pass described with respect to video encoder 20 from FIG. 8.

During the decoding process, video decoder 30 receives an encoded video bitstream that represents video blocks of an encoded video slice and associated syntax elements from video encoder 20. Video decoder 30 stores the received encoded video bitstream in video data memory 78. Video data memory 78 may store video data, such as an encoded video bitstream, to be decoded by the components of video decoder 30. The video data stored in video data memory 78 may be obtained, for example, via link 16, from storage device 26, or from a local video source, such as a camera, or by accessing physical data storage media. Video data memory 78 may form a coded picture buffer (CPB) that stores encoded video data from an encoded video bitstream. DPB 94 may be a reference picture memory that stores reference video data for use in decoding video data by video decoder 30, e.g., in intra- or inter-coding modes. Video data memory 78 and DPB 94 may be formed by any of a variety of memory devices, such as DRAM, SDRAM, MRAM, RRAM, or other types of memory devices. Video data memory 78 and DPB 94 may be provided by the same memory device or separate memory devices. In various examples, video data memory 78 may be on-chip with other components of video decoder 30, or off-chip relative to those components.

Entropy decoding unit 80 of video decoder 30 entropy decodes the video data stored in video data memory 78 to generate quantized coefficients, motion vectors, and other syntax elements. Entropy decoding unit 80 forwards the motion vectors and other syntax elements to prediction processing unit 81. Video decoder 30 may receive the syntax elements at the video slice level and/or the video block level.

When the video slice is coded as an intra-coded (I) slice, intra prediction unit 84 of prediction processing unit 81 may generate prediction data for a video block of the current video slice based on a signaled intra prediction mode and data from previously decoded blocks of the current frame or picture. When the video frame is coded as an inter-coded slice (e.g., B slice or P slice), motion compensation unit 82 of prediction processing unit 81 produces predictive blocks for a video block of the current video slice based on the motion vectors and other syntax elements received from entropy decoding unit 80. The predictive blocks may be produced from one of the reference pictures within one of the reference picture lists. Video decoder 30 may construct the reference frame lists, List 0 and List 1, using default construction techniques based on reference pictures stored in DPB 94.

Motion compensation unit 82 determines prediction information for a video block of the current video slice by parsing the motion vectors and other syntax elements, and uses the prediction information to produce the predictive blocks for the current video block being decoded. For example, motion compensation unit 82 uses some of the received syntax elements to determine a prediction mode (e.g., intra- or inter-prediction) used to code the video blocks of the video slice, an inter-prediction slice type (e.g., B slice or P slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by video encoder 20 during encoding of the video blocks to calculate interpolated values for sub-integer pixels of reference blocks. In this case, motion compensation unit 82 may determine the interpolation filters used by video encoder 20 from the received syntax elements and use the interpolation filters to produce predictive blocks.

Inverse quantization unit 86 inverse quantizes, i.e., de-quantizes, the quantized transform coefficients provided in the bitstream and decoded by entropy decoding unit 80. The inverse quantization process may include use of a quantization parameter calculated by video encoder 20 for each video block in the video slice to determine a degree of quantization and, likewise, a degree of inverse quantization that should be applied. Inverse transform processing unit 88 applies an inverse transform, e.g., an inverse DCT, an inverse integer transform, or a conceptually similar inverse transform process, to the transform coefficients in order to produce residual blocks in the pixel domain.

After prediction processing unit generates the predictive block for the current video block using, for example, intra or inter prediction, video decoder 30 forms a reconstructed video block by summing the residual blocks from inverse transform processing unit 88 with the corresponding predictive blocks generated by motion compensation unit 82. Summer 90 represents the component or components that perform this summation operation.

Filter unit 92 filters the reconstructed video block using, for example, one or more of a deblocking filter, an ALF filter, an SAO filter, or other types of filters. Other loop filters (either in the coding loop or after the coding loop) may also be used to smooth pixel transitions or otherwise improve the video quality. The decoded video blocks in a given frame or picture are then stored in DPB 94, which stores reference pictures used for subsequent motion compensation. DPB 94 may be part of or separate from additional memory that stores decoded video for later presentation on a display device, such as display device 32 of FIG. 1.

Figure 10:
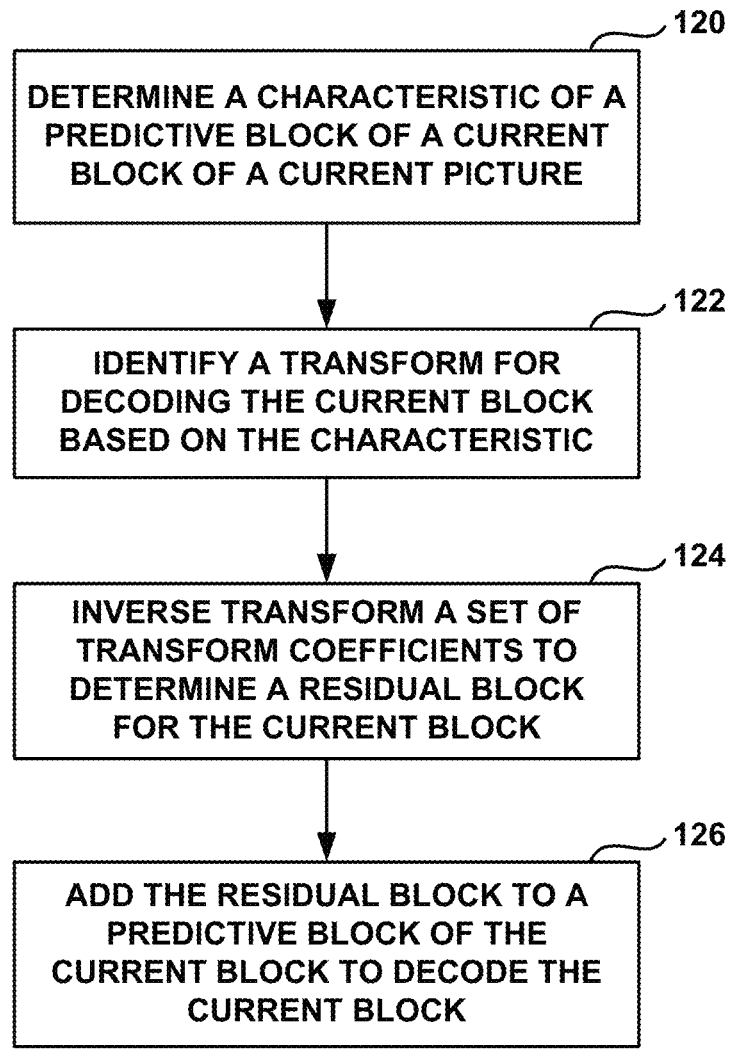
FIG. 10 is a flow diagram illustrating an example video decoding technique described in this disclosure.

FIG. 10 is a flow diagram illustrating an example video decoding technique described in this disclosure. The example of FIG. 10 will be described with respect to video decoder 30 of FIGS. 1 and 9, although the techniques of FIG. 10 specifically and this disclosure generally are not limited to any specific type of video decoder. In the example of FIG. 10, video decoder 30 determines a characteristic of a predictive block of a current block of a current picture (120). Video decoder 30 identifies a transform for decoding the current block based on the characteristic (122).

Video decoder 30 may, for example, compare the characteristic of the predictive block of the current block of the current picture to characteristics of other blocks in the video data to locate a second block and identify the transform for decoding the current block based on the second block. The second block may, for example, be a block from a reference picture or a block from a decoded portion of the current picture. The second block may overlap, either completely or partially, multiple CUs. To compare the characteristic of the predictive block of the current block of the current picture to characteristics of the other blocks in the video data, video decoder 30 may compare neighboring reconstructed samples of the current block to neighboring reconstructed samples of the other blocks. To compare the characteristic of the predictive block of the current block of the current picture to characteristics of the other blocks in the video data, video decoder 30 may compare a predictive block of the current block to predictive blocks of the other blocks.

In other examples, to determine the characteristic of the predictive block of the current block of the current picture, video decoder 30 may determine a presence of an edge in the predictive block; and wherein identifying the transform for decoding the current block based on the characteristic comprises determining a transform associated with the presence of the edge. To determine the characteristic of the predictive block of the current block of the current picture, video decoder 30 may determine an amount of variance in the predictive block; and wherein identifying the transform for decoding the current block based on the characteristic comprises determining a transform associated with the amount of variance. To determine the characteristic of the predictive block of the current block of the current picture comprises determining an edge direction in the predictive block, and to identify the transform for decoding the current block based on the characteristic, video decoder 30 may determine a transform associated with the edge direction. To determine the characteristic of the predictive block of the current block of the current picture, video decoder 30 may determine a coding mode of the predictive block, and to identify the transform for decoding the current block based on the characteristic, video decoder 30 may determine a transform associated with the coding mode. To determine the characteristic of the predictive block of the current block of the current picture, video decoder 30 may determine an adaptive loop filter classification for the predictive block, and to identify the transform for decoding the current block based on the characteristic, video decoder 30 may determine a transform associated with the adaptive loop filter classification.

In one example, to identify the transform for decoding the current block based on the characteristic, video decoder 30 may directly identify a transform based on the characteristic without receiving additional signaling. In other examples, to identify the transform for decoding the current block based on the characteristic, video decoder 30 may identify a subset of available transforms based on the characteristic and receive an index value that identifies a transform from the subset as the transform for decoding the current block. After identifying the transform, video decoder 30 inverse transforms a set of transform coefficients to determine a residual block for the current block (124). Video decoder 30 adds the residual block to a predictive block of the current block to decode the current block (126).

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method for decoding video data, the method comprising:
    determining that a current block of a current picture is encoded in an inter prediction mode;
    determining a motion vector for the current block;
    determining, using the motion vector, a predictive block for the current block;
    determining a characteristic of the predictive block, wherein the characteristic is one of values of neighboring reconstructed samples of the current block, the presence of an edge in the predictive block, an edge direction in the predictive block, or an adaptive loop filter classification of the current block;
    comparing the characteristic of the predictive block of the current block of the current picture to characteristics of other blocks in the video data to locate a second block, wherein the other blocks are located in one or both of an already decoded region of the current picture or reference pictures for the current picture, and wherein the second block is a different block than the current block;
    identifying, from a group of pre-defined transform candidates, a transform for decoding the current block based on the second block;
    inverse transforming transform coefficients to determine a residual block for the current block using the identified transform;
    adding the residual block to the predictive block of the current block to decode the current block; and
    outputting, for display or storage in a decoded picture buffer, a picture that includes decoded version of the current block.

2. The method of claim 1, further comprising:
    identifying the transform for decoding the current block based on a transform used to decode the second block.

3. The method of claim 1, wherein the second block comprises a block from a reference picture.

4. The method of claim 1, wherein the second block comprises a block from a decoded portion of the current picture.

5. The method of claim 1, wherein the second block overlaps multiple coding units.

6. The method of claim 1, wherein comparing the characteristic of the predictive block of the current block of the current picture to characteristics of the other blocks in the video data comprises comparing neighboring reconstructed samples of the current block to neighboring reconstructed samples of the other blocks.

7. The method of claim 1, wherein comparing the characteristic of the predictive block of the current block of the current picture to characteristics of the other blocks in the video data comprises comparing the predictive block of the current block to predictive blocks of the other blocks.

8. The method of claim 1, wherein determining the characteristic of the predictive block of the current block of the current picture comprises determining a presence of an edge in the predictive block; and wherein identifying the transform for decoding the current block based on the characteristic comprises determining a transform associated with the presence of the edge.

9. The method of claim 1, wherein determining the characteristic of the predictive block of the current block of the current picture comprises determining an amount of variance in the predictive block; and wherein identifying the transform for decoding the current block based on the characteristic comprises determining a transform associated with the amount of variance.

10. The method of claim 1, wherein determining the characteristic of the predictive block of the current block of the current picture comprises determining an edge direction in the predictive block; and wherein identifying the transform for decoding the current block based on the characteristic comprises determining a transform associated with the edge direction.

11. The method of claim 1, wherein determining the characteristic of the predictive block of the current block of the current picture comprises determining a coding mode used to identify the predictive block; and wherein identifying the transform for decoding the current block based on the characteristic comprises determining a transform associated with the coding mode.

12. The method of claim 1, wherein identifying the transform for decoding the current block based on the characteristic comprises:
identifying a subset of available transforms based on the characteristic; and
receiving an index value, wherein the index value identifies a transform from the subset as the transform for decoding the current block.

13. A device for decoding video data, the device comprising:
a memory configured to store the video data; and
one or more processors configured to:
determine that a current block of a current picture is encoded in an inter prediction mode;
determine a motion vector for the current block;
determine, using the motion vector, a predictive block for the current block;
determine a characteristic of the predictive block, wherein the characteristic is one of values of neighboring reconstructed samples of the current block, the presence of an edge in the predictive block, an edge direction in the predictive block, or an adaptive loop filter classification of the current block;
compare the characteristic of the predictive block of the current block of the current picture to characteristics of other blocks in the video data to locate a second block, wherein the other blocks are located in one or both of an already decoded region of the current picture or reference pictures for the current picture, and wherein the second block is a different block than the current block;
identify, from a group of pre-defined transform candidates, a transform for decoding the current block based on the second block;
inverse transform a set of transform coefficients to determine a residual block for the current block using the identified transform;
add the residual block to the predictive block of the current block to decode the current block; and
output, for display or storage in a decoded picture buffer, a picture that includes a decoded version of the current block.

14. The device of claim 13, wherein the one or more processors are further configured to:
identify the transform for decoding the current block based on a transform used to decode the second block.

15. The device of claim 13, wherein the second block comprises a block from a reference picture.

16. The device of claim 13, wherein the second block comprises a block from a decoded portion of the current picture.

17. The device of claim 13, wherein the second block overlaps multiple coding units.

18. The device of claim 13, wherein to compare the characteristic of the predictive block of the current block of the current picture to characteristics of the other blocks in the video data, the one or more processors are further configured to compare neighboring reconstructed samples of the current block to neighboring reconstructed samples of the other blocks.

19. The device of claim 13, wherein to compare the characteristic of the predictive block of the current block of the current picture to characteristics of the other blocks in the video data, the one or more processors are further configured to compare the predictive block of the current block to predictive blocks of the other blocks.

20. The device of claim 13, wherein to determine the characteristic of the predictive block of the current block of the current picture, the one or more processors are further configured to determine a presence of an edge in the predictive block; and wherein to identify the transform for decoding the current block based on the characteristic, the one or more processors are further configured to determine a transform associated with the presence of the edge.

21. The device of claim 13, wherein to determine the characteristic of the predictive block of the current block of the current picture, the one or more processors are further configured to determine an amount of variance in the predictive block; and wherein to identify the transform for decoding the current block based on the characteristic, the one or more processors are further configured to determine a transform associated with the amount of variance.

22. The device of claim 13, wherein to determine the characteristic of the predictive block of the current block of the current picture, the one or more processors are further configured to determine an edge direction in the predictive block; and wherein to identify the transform for decoding the current block based on the characteristic, the one or more processors are further configured to determine a transform associated with the edge direction.

23. The device of claim 13, wherein to determine the characteristic of the predictive block of the current block of the current picture, the one or more processors are further configured to determine a coding mode used to identify the predictive block; and wherein to identify the transform for decoding the current block based on the characteristic, the one or more processors are further configured to determine a transform associated with the coding mode.

24. The device of claim 13, wherein to identify the transform for decoding the current block based on the characteristic, the one or more processors are further configured to:
identify a subset of available transforms based on the characteristic; and
receive an index value, wherein the index value identifies a transform from the subset as the transform for decoding the current block.

25. The device of claim 13, wherein the device comprises a wireless communication device, further comprising a receiver configured to receive encoded video data.

26. The device of claim 25, wherein the wireless communication device comprises a telephone handset and wherein the receiver is configured to demodulate, according to a wireless communication standard, a signal comprising the encoded video data.

27. An apparatus for decoding video data, the apparatus comprising:
means for determining that a current block of a current picture is encoded in an inter prediction mode;
means for determining a motion vector for the current block;
means for determining, using the motion vector, a predictive block for the current block;
means for determining a characteristic of the predictive block, wherein the characteristic is one of values of neighboring reconstructed samples of the current block, the presence of an edge in the predictive block, an edge direction in the predictive block, or an adaptive loop filter classification of the current block;

means for comparing the characteristic of the predictive block of the current block of the current picture to characteristics of other blocks in the video data to locate a second block, wherein the other blocks are located in one or both of an already decoded region of the current picture or reference pictures for the current picture, and wherein the second block is a different block than the current block;

means for identifying, from a group of pre-defined transform candidates, a transform for decoding the current block based on the second block;

means for inverse transforming transform coefficients to determine a residual block for the current block using the identified transform;

means for adding the residual block to the predictive block of the current block to decode the current block; and means for outputting, for display or storage in a decoded picture buffer, a picture that includes decoded version of the current block.

28. A computer-readable medium for storing instructions that when executed by one or more processors cause the one or more processors to:

determine that a current block of a current picture is encoded in an inter prediction mode;

determine a motion vector for the current block;

determine, using the motion vector, a predictive block for the current block;

determine a characteristic of the predictive block, wherein the characteristic is one of values of neighboring reconstructed samples of the current block, the presence of an edge in the predictive block, an edge direction in the predictive block, or an adaptive loop filter classification of the current block;

compare the characteristic of the predictive block of the current block of the current picture to characteristics of other blocks in the video data to locate a second block, wherein the other blocks are located in one or both of an already decoded region of the current picture or reference pictures for the current picture, and wherein the second block is a different block than the current block;

identify, from a group of pre-defined transform candidates, a transform for decoding the current block based on the second block;

inverse transform a set of transform coefficients to determine a residual block for the current block using the identified transform;

add the residual block to the predictive block of the current block to decode the current block; and output, for display or storage in a decoded picture buffer, a picture that includes a decoded version of the current block.

* * * * *